(12) United States Patent
Li et al.

(10) Patent No.: US 11,530,281 B2
(45) Date of Patent: Dec. 20, 2022

(54) ULTRA-HIGH MOLECULAR WEIGHT, ULTRA-FINE PARTICLE SIZE POLYETHYLENE, PREPARATION METHOD THEREFOR AND USE THEREOF

(71) Applicant: INSTITUTE OF CHEMISTRY, CHINESE ACADEMY OF SCIENCES, Beijing (CN)

(72) Inventors: Huayi Li, Beijing (CN); Qian Li, Beijing (CN); Tongbing Sun, Beijing (CN); Caizhen Zhu, Beijing (CN); Ruigang Liu, Beijing (CN); Ning Zhao, Beijing (CN); Jian Xu, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 539 days.

(21) Appl. No.: 16/279,677

(22) Filed: Feb. 19, 2019

(65) Prior Publication Data
US 2019/0185596 A1 Jun. 20, 2019

Related U.S. Application Data

(63) Continuation-in-part of application No. PCT/CN2017/075495, filed on Mar. 2, 2017.

(30) Foreign Application Priority Data

Aug. 19, 2016 (CN) .......................... 201610694953.1
Aug. 19, 2016 (CN) .......................... 201610695013.4
Aug. 19, 2016 (CN) .......................... 201610695021.9
Aug. 19, 2016 (CN) .......................... 201610695051.X
Aug. 19, 2016 (CN) .......................... 201610695066.6
Aug. 19, 2016 (CN) .......................... 201610695124.5

(51) Int. Cl.
| | | |
|---|---|---|
| *C08F 110/02* | (2006.01) | |
| *C08F 4/658* | (2006.01) | |
| *C08J 5/08* | (2006.01) | |
| *B29C 48/00* | (2019.01) | |
| *B29C 48/09* | (2019.01) | |
| *B29C 48/07* | (2019.01) | |
| *B29B 7/90* | (2006.01) | |
| *B29C 55/00* | (2006.01) | |
| *B29C 55/12* | (2006.01) | |
| *C08F 255/02* | (2006.01) | |
| *C08J 5/18* | (2006.01) | |
| *C08K 3/40* | (2006.01) | |
| *C08K 7/14* | (2006.01) | |
| *D01D 5/06* | (2006.01) | |

(Continued)

(52) U.S. Cl.
CPC .............. *C08F 110/02* (2013.01); *B29B 7/90* (2013.01); *B29C 48/0018* (2019.02); *B29C 48/022* (2019.02); *B29C 48/07* (2019.02); *B29C 48/09* (2019.02); *B29C 55/005* (2013.01); *B29C 55/12* (2013.01); *C08F 4/658* (2013.01); *C08F 255/02* (2013.01); *C08J 5/08* (2013.01); *C08J 5/18* (2013.01); *C08K 3/40* (2013.01); *C08K 7/14* (2013.01); *D01D 5/06* (2013.01); *D01D 5/12* (2013.01); *D01F 6/46* (2013.01); *B29K 2023/0683* (2013.01); *B29K 2309/08* (2013.01); *B29L 2007/002* (2013.01); *B29L 2023/22* (2013.01); *C08F 2500/01* (2013.01); *C08F 2500/24* (2013.01); *C08F 2500/26* (2013.01); *C08J 2323/06* (2013.01); *C08K 2201/004* (2013.01)

(58) Field of Classification Search
CPC ....... C08F 4/658; C08F 110/02; C08F 255/02
See application file for complete search history.

(56) References Cited

U.S. PATENT DOCUMENTS

2015/0284484 A1* 10/2015 Zhou ..................... C08F 110/02
526/352

FOREIGN PATENT DOCUMENTS

| CN | 1034548 A | 8/1989 |
|---|---|---|
| CN | 1047302 A | 11/1990 |

(Continued)

OTHER PUBLICATIONS

Rengarajan, Ramesh et al."Solid Phase Graft Copolymerization", Polymer, vol. 30, May 1989, pp. 933-935.
Zhang, He-Xin et al. "Preparation of Ultra High Molecular Weight Polyethylene with MgCI2/TiCI4 Catalyst: Effect of Hydrogen and Cocatalyst on Molecular Wight and Molecular Weight Distribution", Macromolecular Research, vol. 20, No. 1, 2012, pp. 112-115.

*Primary Examiner* — Edward J Cain
(74) *Attorney, Agent, or Firm* — Novick, Kim & Lee, PLLC; Allen Xue

(57) ABSTRACT

An ultra-high molecular weight, ultra-fine particle size polyethylene has a viscosity average molecular weight (Mv) greater than $1 \times 10^6$. The polyethylene is spherical or are sphere-like particles having a mean particle size of 10-100 μm, having a standard deviation of 2-15 μm and a bulk density of 0.1-0.3 g/mL. Using the polyethylene as a basic polyethylene, a grafted polyethylene can be obtained by means of a solid-phase grafting method; and a glass fiber-reinforced polyethylene composition comprising the polyethylene and glass fibers, and a sheet or pipe prepared therefrom; a solubilized ultra-high molecular weight, ultra-fine particle size polyethylene; and a fiber and a film prepared from the solubilized ultra-high molecular weight, ultra-fine particle size polyethylene may also be obtained. The method has simple steps, is easy to control, has a relatively low cost and a high repeatability, and can realize industrialisation.

15 Claims, 1 Drawing Sheet

(51) Int. Cl.
  *D01D 5/12* (2006.01)
  *D01F 6/46* (2006.01)
  *B29K 23/00* (2006.01)
  *B29K 309/08* (2006.01)
  *B29L 7/00* (2006.01)
  *B29L 23/00* (2006.01)

(56) References Cited

FOREIGN PATENT DOCUMENTS

| | | | |
|---|---|---|---|
| CN | 1091748 | A | 9/1994 |
| CN | 1109067 | A | 9/1995 |
| CN | 1110281 | A | 10/1995 |
| CN | 1199056 | A | 11/1998 |
| CN | 1214343 | A | 4/1999 |
| CN | 1283642 | A | 2/2001 |
| CN | 1330086 | A | 1/2002 |
| CN | 1397568 | A | 2/2003 |
| CN | 1452637 | A | 10/2003 |
| CN | 1453298 | A | 11/2003 |
| CN | 1463990 | A | 12/2003 |
| CN | 1528793 | A | 9/2004 |
| CN | 1563112 | A | 1/2005 |
| CN | 1690039 | A | 11/2005 |
| CN | 1732671 | A | 2/2006 |
| CN | 1831017 | A | 9/2006 |
| CN | 1891722 | A | 1/2007 |
| CN | 1986576 | A | 6/2007 |
| CN | 101096389 | A | 1/2008 |
| CN | 101125898 | A | 2/2008 |
| CN | 101357968 | A | 2/2009 |
| CN | 101423566 | A | 5/2009 |
| CN | 101423570 | A | 5/2009 |
| CN | 101423571 | A | 5/2009 |
| CN | 101423572 | A | 5/2009 |
| CN | 101560273 | A | 10/2009 |
| CN | 101768809 | A | 7/2010 |
| CN | 102015792 | A | 4/2011 |
| CN | 102181089 | A | 9/2011 |
| CN | 102505158 | A | 6/2012 |
| CN | 102690397 | A | 9/2012 |
| CN | 103524763 | A | 1/2014 |
| CN | 103772537 | A | 5/2014 |
| CN | 103772560 | A | 5/2014 |
| CN | 104829762 | A | 8/2015 |
| CN | 106188405 | A | 12/2016 |
| CN | 106188785 | A | 12/2016 |
| CN | 106279474 | A | 1/2017 |
| CN | 106317273 | A | 1/2017 |
| CN | 106317562 | A | 1/2017 |
| CN | 106319667 | A | 1/2017 |
| EP | 0361493 | A1 | 4/1990 |
| EP | 0361494 | A2 | 4/1990 |
| EP | 1840138 | A1 | 10/2007 |
| EP | 2029637 | B1 | 4/2010 |
| JP | 5-507748 | A | 11/1993 |
| JP | 2015093929 | | 5/2015 |
| JP | 2015131880 | | 7/2015 |
| WO | 0181432 | A1 | 11/2001 |
| WO | 03002617 | A1 | 1/2003 |
| WO | 2007147864 | A2 | 12/2007 |

\* cited by examiner

ULTRA-HIGH MOLECULAR WEIGHT, ULTRA-FINE PARTICLE SIZE POLYETHYLENE, PREPARATION METHOD THEREFOR AND USE THEREOF

TECHNICAL FIELD

The present invention relates to the field of polyolefin polymeric materials, and in particular to an ultra-high molecular weight, ultra-fine particle size polyethylene, a preparation method therefor and a use thereof.

BACKGROUND ART

Ultra-high molecular weight polyethylene (UHMWPE) is a thermoplastic engineering plastic with a linear molecular structure and excellent comprehensive properties, which is synthesized by low-pressure polymerization of ethylene and butadiene monomers and catalyzed by Ziegler catalyst to have an average molecular weight of more than 1.5 million. The ultra high molecular weight of UHMWPE endows it with excellent service performance (usually a molecular weight of high-density polyethylene HDPE is only 20,000-300,000), and thus UHMWPE has unique properties that common HDPE and other engineering plastics do not have, such as excellent impact resistance, abrasion resistance, chemical corrosion resistance, low temperature resistance, stress cracking resistance, anti-adhesion and self-lubricating, etc., called "amazing plastic". The material has superior comprehensive properties, low density and low friction coefficient; its wear resistance, low temperature resistance, corrosion resistance, self-lubrication and impact resistance properties are highest among all plastics; its wear resistance property is better than that of polytetrafluoroethylene (PTFE), nylon, carbon steel and other materials; it can work at from −169° C. to 80° C. for a long time; its physical and mechanical properties far exceed those of common polyethylene. It can be widely used in metallurgy, electric power, petroleum, textile, papermaking, food, chemical engineering, machinery, electrical and other industries.

Although UHMWPE, as a thermoplastic engineering plastic, has excellent comprehensive properties in the solid state, the properties of its melt are quite different from those of common thermoplastic plastics such as common polyethylene, mainly in the following aspects: 1) high melt viscosity; 2) low friction coefficient; 3) low critical shear rate; 4) narrow molding temperature range, easy oxidation and degradation. The processing technology of UHMWPE has developed from initial press-sintering moulding to extrusion, blow and injection, solution spinning and other moulding methods for decades, however, due to the above problems of UHMWPE, it brings processing difficulties and causes performance degradation when applied in profiles, films, fibers, filter materials, etc.

For example, the viscosity of the system increases sharply with increasing UHMWPE content. The treatment of highly viscous stock solutions is difficult in traditional wet process, which limits applications of UHMWPE. For instance, in the conventional wet preparation process, the polyolefin is firstly heated and dissolved in paraffin or other solvents to form a homogeneous solution, cooled after being pressed into a thin slice with a vulcanizer, and a liquid-liquid phase separation occurs. After extraction and then stretching or vice versa, a porous separator is obtained. The polyolefin crystallizes during the cooling process, and the liquid-liquid separation occurs, which makes it difficult for the thin film to undergo a high-ratio drawing process, thus limiting the improvement in the overall performance of the separator. Therefore, it is difficult to prepare a separator from a solution containing ultra-high molecular weight polyethylene by traditional wet process, mainly because a liquid-solid phase separation or liquid-liquid phase separation takes place in a homogeneous solution during the cooling process, and the polyolefin crystallizes during the phase separation process, which causes the film to be difficult to be drawn at a high ratio, and consequently the improvement in the overall performance of the separator is limited.

Therefore, current research focuses on how to prepare UHMWPE with excellent processing properties. Catalysts used in the preparation of UHMWPE are been widely studied by some researchers, in order to make a breakthrough in the preparation of high-performance UHMWPE. The catalysts used in the preparation of UHMWPE are mainly metallocene catalysts and Ziegler-Natta catalysts. However, metallocene catalysts are extremely sensitive to temperature. When ethylene polymerization is catalyzed by Cp2ZrCl2, molecular weights of the polymer decrease from 600,000 to 120,000 as increasing the temperature from 20° C. to 70° C. Meanwhile, if metallocene catalysts are to achieve the sufficiently high catalytic activities, a large amount of expensive methylaluminoxane (MAO) is required as cocatalyst, thus increasing production costs; furthermore, the cocatalyst MAO is not a single compound, so it is easy to cause product performance unstable in the product processing. Ziegler-Natta catalysts are industrial catalysts for UHMWPE manufacturing. For example, Zhang H. X. et al. (Polym. Bull., 2011, 66, 627) reported a preparation method of UHMWPE using a Ziegler-Natta catalyst containing internal electron donors; however, the internal electron donors in the Ziegler-Natta catalyst reduce the catalyst activity.

Therefore, there is an urgent need for a new preparation method of UHMWPE, by which high-performance UHMWPE can be prepared, and by which the polymer does not decrease its properties when processed into profiles, films, fibers or filter materials, having more excellent processability and wider application prospects.

As a general-purpose plastic, polyethylene is famous for its large output, widespread use and low cost. However, polyethylene has poor cold resistance, weather resistance, light resistance, dyeability, adhesion, antistatic property and hydrophilicity, and also poor compatibility with other polar polymers, inorganic fillers and reinforcing materials. These shortcomings limit applications of polyethylene in the fields of packaging materials, automotive industry, electronics industry and medical devices, etc.

In order to improve polyethylene properties and expand its range of applications, it is necessary to modify polyethylene. There are many methods for modifying polyethylene, among which graft modification is one of the most important ones. There are many types of graft modification processes, such as chemical grafting, mechanical grafting, photo-grafting, etc. Among them, chemical grafting includes solution grafting, solid phase grafting, melt grafting, gas phase grafting, suspension grafting, etc. The solid phase grafting process used in polyethylene modification started later. In the late 1980s, Rengarajan et al. first reported the preparation of maleic anhydride functionalized polypropylene by the solid-phase grafting process. Subsequently, monomers used in the solid-phase graft modification of polyethylene were reported including styrene, glycidyl methacrylate, 4-vinylpyridine, vinylnitrile, 2-hydroxyethyl methacrylate, etc. Compared to other grafting processes, the solid-phase grafting process is not only to introduce polar functional groups on polyethylene while maintaining the original polyethylene properties, but also to have advantages such as low temperature, low pressure, low cost, high grafting rate, no solvent recovery, etc.

However, one of major difficulties in solid-phase graft modification of polyethylene is currently that the effective grafting rate of modified polyethylene prepared by conventional processes or technologies is very low, which is generally only 1% reported in the literatures now. It is obvious that the improvement of polyethylene properties is limited due to the modification with such a low grafting rate. In recent years, researchers have developed a series of solid-phase grafting processes to increase the grafting rates, for example, supercritical carbon dioxide-assisted solid-phase grafting, grafting modification of polyethylene using a pan-mill type mechanochemical reactor, ultrasound-assisted solid-phase grafting, comonomer melt grafting, radiation grafting, etc. Although the temperature and time for grafting by these methods can be reduced, and the grafting rate can be increased to some extent, the entire reaction processes are too complicated. Moreover, the introduction of new media or equipment has greatly increased production costs, and it is difficult to achieve large-scale and low-cost production. Therefore, it is of great significance to develop a low-cost preparation method of grafted polyethylene with high grafting rates using conventional methods.

Polyethylene fibers include long fibers, short fibers, non-woven fabrics, etc. Among them, long polyethylene fibers exhibit good gloss, soft handfeel, good drape and low density, which are applicable in the knitting industry, and they are the ideal material for making high-grade sportswears, T-shirts, etc., when mixed with cotton, viscose, silk, spandex, and so on, into cotton-covered polypropylene products, silk-covered polypropylene products, etc.; short polyethylene fibers blended with cotton can be made into cotton fine cloth, bed sheets and with viscose can be made into blankets, pure and blended polyethylene wool, carpets, cotton wool and cigarette filters; polyethylene non-woven fabrics are used in disposable medical and sanitary products, disposable anti-fouling clothes, agricultural cloth, furniture cloth or linings for footwear, or in the fields of health care, thermal materials, filter materials, etc. Although conventional polyethylene fibers have many advantages such as light weight, high strength, good elasticity, good wear resistance, good corrosion resistance, good insulation, good warmth retention, etc., they still have disadvantages of poor heat resistance, low temperature resistance and poor aging resistance, and they also have poor hygroscopic and dyeing properties.

Molding processes of chemical fibers include wet spinning, dry-wet spinning, melt spinning, etc. Among molding processes of chemical fibers, drawing is an important process. The anisotropic properties of the polymers in the chemical fiber, such as mechanical anisotropy, optical anisotropy, thermal anisotropy, etc., can be caused by drawing, which effectively increases the strength of the chemical fibers. For melt spinning, hot-rolling drawing, hot-plate drawing and hot-box drawing are mainly used in the drawing process; for wet or dry-wet spinning, in addition to the above-mentioned drawing methods, pressurized steam drawing can also be used. It is also a current research direction for improving the above-mentioned shortcomings of polyethylene by adjusting processing methods.

Polyethylene films, particularly biaxially stretched polyethylene films, have excellent bending fatigue resistance, high heat resistance, good chemical properties, pure and non-toxicity, good transparency, etc., and are mainly used in the field of packaging films. However, they have low temperature resistance and low impact strength. In the prior art, the methods, such as copolymerization with propylene, addition of a blending modifier (e.g. ethylene propylene rubber, EPDM, POE, EVA or SBS, etc.), etc., were used to improve low temperature resistance. However, the low temperature resistance is improved by the methods, but other excellent properties of polyethylene, such as strength, modulus, etc., are affected.

In addition, polyethylene microporous films are also widely used in battery separators, electrolytic capacitor separators, various filters, waterproof and moisture permeable clothes, reverse osmosis membranes, ultrafiltration membranes, microfiltration membranes, etc. When used as battery separators, films are required to have excellent permeability, mechanical properties, heat shrinkage resistance, melting characteristics, etc. How to obtain polyethylene microporous films having excellent properties has always been the goal of researchers.

Polyethylene is one of the most heavily used general-purpose plastics. It has a relatively balanced overall performance and is therefore heavily used in the fields of automobiles, electrical appliances, and building materials. Although polyethylene has good wear resistance, chemical corrosion resistance, stress crack resistance, anti-adhesion and self-lubricating, etc., it is resistant to poor low-temperature resistance, poor impact resistance and easily aging.

Glass fiber reinforced polyethylene (GFPE) has attracted more and more researchers' attention in recent years due to its advantages of improved rigidity, impact strength, creep resistance, low warpage, dynamic fatigue resistance, good dimensional stability, etc. Although it is possible to improve low-temperature resistance of glass fiber reinforced polyethylene, there are still problems such as poor compatibility between glass fibers and polyethylene, low impact resistance and low creep resistance, etc. A new type of glass fiber reinforced polyethylene composites is to be developed.

DETAILED DESCRIPTION OF THE INVENTION

It is a first object of the present invention to provide an ultra-high molecular weight, ultra-fine particle size polyethylene powder with excellent processability and its preparation method.

It is a second object of the present invention to provide an ultra-high molecular weight, ultra-fine particle size graft-modified polyethylene and its solid-phase grafting method, by which the grafted polyethylene with higher grafting rate can be simply and efficiently prepared, and the polyethylene is more effectively modified.

It is a third object of the present invention to provide a glass fiber reinforced polyethylene composition and the prepared sheet and pipe. The sheet or pipe prepared from the composition has excellent low-temperature resistance, excellent mechanical properties (especially impact resistance and creep resistance) and thermal properties.

It is a fourth object of the present invention to provide a solubilized ultra-high molecular weight, ultra-fine particle size polyethylene and the preparation method thereof. The polyethylene has characteristics such as more excellent processability and easier processing.

It is a fifth object of the present invention to provide a fiber prepared from the solubilized ultra-high molecular weight, ultra-fine particle size polyethylene, which has excellent low-temperature resistance, excellent mechanical properties and thermal properties, and the preparation method thereof.

It is a sixth object of the present invention to provide a film prepared from the solubilized ultra-high molecular weight, ultra-fine particle size polyethylene, which has excellent low-temperature resistance, excellent mechanical properties and thermal properties, and the preparation method thereof. Furthermore, the film of the present invention is particularly suitable for use in a battery separator because of its excellent mechanical properties, thermal properties, permeability, melting properties, etc.

A first aspect of the present invention provides a method for preparing an ultra-high molecular weight, ultra-fine particle size polyethylene powder, which comprises the following steps:

under the action of a catalyst, carrying out ethylene polymerization, wherein the polymerization temperature is −20° C. to 100° C.; in ethylene, a content of carbon monoxide is not higher than (for example, less than) 5 ppm, a content of carbon dioxide is not higher than (for example, less than) 15 ppm, and a content of conjugated diene is not higher than (less than) 10 ppm;

the catalyst is prepared by a method comprising the following steps:

(a) mixing a magnesium halide, an alcohol compound, an auxiliary agent, a part of internal electron donor compound and a solvent to prepare mixture I;

(b) adding the aforementioned mixture I into a reactor, preheating to −30° C.-30° C., adding an titanium compound dropwise; or, adding the titanium compound into the reactor, preheating to −30° C.-30° C., adding the aforementioned mixture I dropwise;

(c) after the completion of the dropwise addition, raising the temperature of the reaction system to 90° C.-130° C. for 0.5-3 hours, adding the rest internal electron donor compound, and continuously reacting;

(d) filtering off the liquid of the reaction system, adding the rest titanium compound, and continuously reacting;

(e) after the completion of the reaction, obtaining the catalyst by using post-treatment;

wherein the viscosity average molecular weight (Mv) of the prepared polyethylene powder is greater than $1\times10^6$, and the polyethylene powder is spherical or sphere-like particles having a mean particle size of 10-100 μm, a standard deviation of 2 μm-15 μm and a bulk density of 0.1 g/mL-0.3 g/mL.

According to the present invention, the particle size distribution of the polyethylene powder is an approximately normal distribution.

According to the present invention, the temperature of the polymerization reaction is preferably 30° C.-80° C., more preferably 50° C.-80° C.

A second aspect of the present invention provides an ultra-high molecular weight, ultra-fine particle size polyethylene powder obtained by the above preparation method; the viscosity average molecular weight (Mv) of the polyethylene powder is greater than $1\times10^6$, and the polyethylene powder is spherical or sphere-like particles having a mean particle size of 10-100 μm, a standard deviation of 2 μm-15 μm and a bulk density of 0.1 g/mL-0.3 g/mL. The powder of the present invention has excellent processability.

According to the present invention, the particle size distribution of the polyethylene powder is an approximately normal distribution.

According to the present invention, the viscosity average molecular weight (Mv) of the polyethylene is greater than or equal to $1.5\times10^6$, more preferably $1.5\times10^6$-$4.0\times10^6$; the molecular weight distribution (Mw/Mn) of the polyethylene is 2-15, preferably 2-10.

According to the present invention, the mean particle size of the polyethylene powder is preferably 20 μm-80 μm, more preferably 50 μm-80 μm; the standard deviation is preferably 5 μm-15 μm, more preferably 6 μm-12 μm, still more preferably 8 μm-10 μm; the bulk density of the polyethylene powder is preferably 0.15-0.25 g/mL.

A third aspect of the present invention provides a method for preparing an ultra-high molecular weight, ultra-fine particle size grafted polyethylene by a solid-phase grafting method, which comprises the following steps:

in the container, adding a polyethylene, a grafting monomer, an initiator and an interface agent, stirring and mixing homogenously; carrying out the solid-phase grafting reaction by heating; and obtaining the grafted polyethylene;

the polyethylene is powder, which is spherical or sphere-like particles having a mean particle size of 10 μm-100 μm; a standard deviation of 2 μm-15 μm and a bulk density of 0.1 g/mL-0.3 g/mL; the viscosity average molecular weight (Mv) of the polyethylene is greater than $1\times10^6$.

According to the present invention, the particle size distribution of the polyethylene powder is an approximately normal distribution.

According to the present invention, the mean particle size of the polyethylene powder is preferably 20 μm-80 μm, more preferably 50 μm-80 μm; the standard deviation is preferably 5 μm-15 μm, more preferably 6 μm-12 μm, still more preferably 8 μm-10 μm.

According to the present invention, the bulk density of the polyethylene powder is preferably 0.15 g/mL-0.25 g/mL.

According to the present invention, the viscosity average molecular weight (Mv) of the polyethylene is greater than or equal to $1.5\times10^6$, more preferably $1.5\times10^6$-$4.0\times10^6$. The molecular weight distribution (Mw/Mn) of the polyethylene is 2-15, preferably 2-10.

According to the present invention, the stirring and mixing time is 0.5-5 hours. The aim of the stirring is to enable the reactants to be thoroughly and homogenously mixed. In principle, longer stirring time is more beneficial for the reaction. And the stirring and mixing time is preferably 1-5 hours.

According to the present invention, the solid-phase grafting reaction temperature is 60-120° C., and the time is 0.5-5 hours. Preferably, the reaction is carried out at 70-110° C. for 0.5-3.5 hours. More preferably, it is reacted at 80-110° C. for 2-3 hours.

According to the present invention, the polyethylene is an ethylene homopolymer.

According to the present invention, the grafting monomer is a siloxane-based compound or a vinyl-based unsaturated compound.

According to the present invention, the vinyl-based unsaturated compound is, for example, a styrene-based compound, a vinyl-based unsaturated organic acid, a vinyl-based unsaturated organic ester, a vinyl-based unsaturated organic acid anhydride, or a mixture thereof. It is preferably one or more selected from acrylic acid (AA), methacrylic acid (MAA), methyl acrylate (MA), methyl methacrylate (MMA), ethyl acrylate (EA), ethyl methacrylate (MEA), butyl acrylate (BA), butyl methacrylate (BMA), maleic anhydride (MAH), maleic acid, styrene (St), and pentaerythritol triacrylate (PETA).

According to the present invention, the siloxane-based compound is, for example, vinyltrimethylsilane, vinyltriethylsilane, divinyldimethylsilane, (triethylsilyl)acetylene, allyltrimethylsilane, etc., it is preferably one or two selected from vinyltrimethylsilane and vinyltriethylsilane.

According to the present invention, the added amount of the grafting monomer is 0.2-15 wt % by weight of the polyethylene powder, preferably 0.5-12 wt %, more preferably 1-9 wt %.

According to the present invention, the initiator is an azo initiator or a peroxide initiator, preferably one or more selected from azobisisobutyronitrile, benzoyl peroxide or cumene hydroperoxide. The added amount of the initiator is 0.1-10 wt % by weight of the polyethylene powder, preferably 2-9 wt %, more preferably 3-8 wt %.

According to the present invention, the interface agent is an organic solvent having a swelling effect on polyethylene. Preferred is the following organic solvent having a swelling effect on polyethylene: an ether solvent, a ketone solvent, an aromatic hydrocarbon solvent or an alkane solvent; more preferably chlorinated benzene, polychlorinated benzene, alkane or cycloalkane longer than C6, benzene, alkyl-substituted benzene, fatty ether, fatty ketone, or decahydronaphthalene; still more preferably one or more selected from benzene, toluene, xylene, chlorobenzene, tetrahydrofuran, diethyl ether, acetone, hexane, cyclohexane, decahydronaphthalene, heptane. For example, it is xylene or a mixture of xylene and tetrahydrofuran. The added amount of the interface agent is 0.1-30 wt % by weight of the polyethylene powder, preferably 10-25 wt %.

A fourth aspect of the present invention provides a grafted polyethylene obtained by the above solid-phase grafting method for preparing an ultra-high molecular weight, ultra-fine particle size grafted polyethylene, wherein the effective grafting rate of the grafting monomer is ≥0.5%, a base polymer is polyethylene, and the polyethylene is powder, which is spherical or sphere-like particles having a mean particle size of 10 μm-100 μm; a standard deviation of 2 μm-15 μm and a bulk density of 0.1 g/mL-0.3 g/mL; the viscosity average molecular weight (Mv) of the polyethylene is greater than $1 \times 10^6$.

According to the present invention, the particle size distribution of the polyethylene powder is an approximately normal distribution.

According to the present invention, the effective grafting rate is 0.5%-5.5%, more preferably 1.0-3.0%, for example, the effective grafting rate of the grafted polyethylene can be 1.33%, 1.65%, 2.14% or 2.04%.

According to the present invention, a mean particle size of the polyethylene powder is preferably 20 μm-80 μm, more preferably 50 μm-80 μm; a standard deviation is preferably 5 μm-15 μm, more preferably 6 μm-12 μm, still more preferably 8 μm-10 μm. According to the present invention, the water contact angle of the grafted polyethylene is 80°-88°, more preferably 81°-84°.

According to the present invention, the bulk density of the polyethylene is preferably 0.15 g/mL-0.25 g/mL.

According to the present invention, the viscosity average molecular weight (Mv) of the polyethylene is greater than or equal to $1.5 \times 10^6$, more preferably $1.5 \times 10^6$-$4.0 \times 10^6$. The molecular weight distribution (Mw/Mn) of the polyethylene is 2-15, preferably 2-10.

According to the present invention, the polyethylene is an ethylene homopolymer.

According to the present invention, the grafting monomer is a siloxane-based compound or a vinyl-based unsaturated compound.

According to the present invention, the vinyl-based unsaturated compound is, for example, a styrene-based compound, a vinyl-based unsaturated organic acid, a vinyl-based unsaturated organic ester, a vinyl-based unsaturated organic acid anhydride, or a mixture thereof. It is preferably one or more selected from acrylic acid (AA), methacrylic acid (MAA), methyl acrylate (MA), methyl methacrylate (MMA), ethyl acrylate (EA), ethyl methacrylate (MEA), butyl acrylate (BA), butyl methacrylate (BMA), maleic anhydride (MAH), maleic acid, styrene (St), and pentaerythritol triacrylate (PETA).

According to the present invention, the siloxane-based compound is, for example, vinyltrimethylsilane, vinyltriethylsilane, divinyldimethylsilane, (triethylsilyl)acetylene, allyltrimethylsilane, etc., it is preferably one or two selected from vinyltrimethylsilane and vinyltriethylsilane.

According to the present invention, the water contact angle of the grafted polyethylene is less than or equal to 88°. For example, the water contact angle of the grafted polyethylene is 80°-88°. The crystallization temperature of the grafted polyethylene is increased by at least 8° C. compared to that of the base polymer.

A fifth aspect of the present invention provides a glass fiber-reinforced polyethylene composition, which comprises the ultra-high molecular weight, ultra-fine particle size polyethylene and glass fibers;
the viscosity average molecular weight (Mv) of the ultra-high molecular weight, ultra-fine particle size polyethylene is greater than $1 \times 10^6$; the ultra-high molecular weight, ultra-fine particle size polyethylene is spherical or sphere-like particles having a mean particle size of 10-100 μm; a standard deviation of 2 μm-15 μm and a bulk density of 0.1 g/mL-0.3 g/mL.

According to the present invention, the particle size distribution of the ultra-high molecular weight, ultra-fine particle size polyethylene is an approximately normal distribution.

According to the present invention, the viscosity average molecular weight (Mv) of the ultra-high molecular weight, ultra-fine particle size polyethylene is greater than or equal to $1.5 \times 10^6$, more preferably $1.5 \times 10^6$-$4.0 \times 10^6$. The molecular weight distribution (Mw/Mn) of the ultra-high molecular weight, ultra-fine particle size polyethylene is 2-15, preferably 3-10, still preferably 4-8.

According to the present invention, the mean particle size of the ultra-high molecular weight, ultra-fine particle size polyethylene is preferably 20-90 μm, still preferably 30-85 μm, more preferably 50-80 μm; the standard deviation is preferably 5-15 μm, more preferably 6-12 μm, still more preferably 8-10 μm; the bulk density of the ultra-high molecular weight, ultra-fine particle size polyethylene is preferably 0.15-0.25 g/mL, e.g. 0.2 g/mL.

According to the present invention, the glass fibers are treated with a coupling agent. The coupling agent is, for example, one or more selected from a silane coupling agent (e.g. γ-aminopropyltriethoxysilane KH550, γ-(2,3-epoxypropoxy)propyltrimethoxysilane KH560, γ-methacryloxypropyltrimethoxysilane KH570, N-(β-aminoethyl)-γ-aminopropyltrimethoxysilane KH792, N-(β-aminoethyl)-γ-aminopropylmethyldimethoxysilane DL602, vinyltrimethoxysilane A-171, vinyltriethoxysilane A-151, etc.), a titanate coupling agent (such as isopropyl tri(dioctylpyrophosphate)titanate, di(dioctylphosphato)ethylene titanate, diisostearoylethylene titanate) or an aluminate coupling agent. Preferably, the coupling agent is selected from a silane coupling agent, and particularly preferably γ-aminopropyltriethoxysilane KH550, vinyltrimethoxysilane A-171, vinyltriethoxysilane A-151, etc. The coupling agent is used in an amount of 0.5-4 parts by weight per 100 parts by weight of the glass fibers.

According to the present invention, in order to have better dispersion of glass fibers in the coupling agent, a diluent can be added to the system of the glass fibers and the coupling agent, e.g., which selected from white oil or liquid paraffin. The weight ratio of the diluent to the coupling agent is, for example, (1-10): 1, preferably (3-6): 1.

According to the present invention, the length of the glass fibers is 0.5 mm-10 mm, for example, 1 mm-3 mm, or 3 mm-5 mm, or 5 mm-7 mm, etc.

According to the present invention, the weight percent of each component in the composition is 10-95 wt % of the ultra-high molecular weight, ultra-fine particle size polyethylene, and 5-90 wt % of the glass fibers. Preferably, the content of the glass fibers is 10-80 wt %, more preferably 40-70 wt %.

A sixth aspect of the present invention provides a sheet or a pipe, which is prepared from the above-mentioned composition.

A seventh aspect of the present invention provides a method for preparing the above-mentioned sheet, which comprises the following steps: homogenously mixing the ultra-high molecular weight, ultra-fine particle size polyethylene and the glass fibers in a high-speed mixer, adding mixture into a extruder, extruding through a sheet die, and producing the sheet of the present invention by cooling and stretching.

An eighth aspect of the present invention provides a method for preparing the above-mentioned pipe, which comprises the following steps: homogenously mixing the ultra-high molecular weight, ultra-fine particle size polyethylene and the glass fibers in a high-speed mixer, adding mixture into a extruder, extruding through a pipe mold, and producing the pipe of the present invention by cooling and stretching.

Preferably, the wall thickness of the pipe is in the range of 0.1-10 mm, preferably 0.5-5 mm.

A ninth aspect of the present invention provides a use of the above-mentioned sheet, which is used in many fields such as automobiles, electronic devices, etc.

A tenth aspect of the present invention provides a use of the above-mentioned pipe, which is used in the fields of water supply and drainage, oil drilling, etc., for example, as a water supply and drainage pipe or a mining wear-resistant pipe, etc.

An eleventh aspect of the present invention provides a method for preparing a solubilized ultra-high molecular weight, ultra-fine particle size polyethylene, which is selected from method (1) or method (2);

the method (1) comprises the following steps:

(1a) under the action of a catalyst and a dispersion medium, carrying out ethylene polymerization; wherein, the polymerization temperature is −20° C. to 100° C.; wherein, in ethylene, the content of carbon monoxide is less than 5 ppm, the content of carbon dioxide is less than 15 ppm, and the content of conjugated diene is less than 10 ppm;

(1b) after the completion of the polymerization of step (1a), adding a solvent, and then removing the dispersion medium by fractional distillation to obtain the solubilized ultra-high molecular weight, ultra-fine particle size polyethylene;

the method (2) comprises the following steps:

(2a) under the action of a catalyst, a dispersion medium and a solvent, carrying out ethylene polymerization; wherein, the polymerization temperature is −20° C. to 100° C.; wherein, in ethylene, the content of carbon monoxide is less than 5 ppm, the content of carbon dioxide is less than 15 ppm, and the content of conjugated diene is less than 10 ppm;

(2b) after the completion of the polymerization of step (2a), removing the dispersion medium by fractional distillation to obtain the solubilized ultra-high molecular weight, ultra-fine particle size polyethylene;

in method (1) or method (2) as described above, the boiling point of the dispersion medium is lower than that of the solvent and lower by at least 5° C. The aim of setting the temperature difference is to effectively separate the dispersion medium from the system by fractional distillation.

In method (1) or method (2) as described above, the catalyst is prepared by the method for preparing the above-mentioned catalyst.

According to the present invention, wherein, the viscosity average molecular weight (Mv) of the prepared solubilized ultra-high molecular weight, ultra-fine particle size polyethylene is greater than $1\times10^6$; the solubilized ultra-high molecular weight, ultra-fine particle size polyethylene is spherical or sphere-like particles having a mean particle size of 10-100 μm, a standard deviation of 2 μm-15 μm and a bulk density of 0.1 g/mL-0.3 g/mL; the weight percent of the solvent in the solubilized ultra-high molecular weight, ultra-fine particle size polyethylene is more than 0 and less than or equal to 98 wt %.

According to the present invention, the weight percent of the solvent in the solubilized ultra-high molecular weight, ultra-fine particle size polyethylene is more than 0 and less than or equal to 80 wt %, preferably more than 0 and less than or equal to 50 wt %, more preferably 10-50 wt %, still more preferably 20-40 wt %.

According to the present invention, the particle size distribution of the solubilized ultra-high molecular weight, ultra-fine particle size polyethylene is an approximately normal distribution.

In the above-mentioned preparation method, the polymerization uses a slurry method.

In the above-mentioned preparation method, the dispersion medium can be at least one selected from n-pentane, cyclohexane, benzene, toluene, xylene, n-hexane, n-heptane, petroleum ether, etc.

In the above-mentioned preparation method, the solvent is at least one selected from cyclohexane, n-hexane, n-heptane, benzene, toluene, xylene, dichlorobenzene, trichlorobenzene, 1,1,1-trichloroethane, white oil, paraffin, kerosene, olefin mineral oil and decahydronaphthalene.

According to the present invention, the temperature of the polymerization reaction is preferably 0° C.-90° C., preferably 10° C.-85° C., still preferably 30° C.-80° C., more preferably 50° C.-80° C.

A twelfth aspect of the present invention provides a solubilized ultra-high molecular weight, ultra-fine particle size polyethylene prepared by the above-mentioned method for preparing a solubilized ultra-high molecular weight, ultra-fine particle size polyethylene, the viscosity average molecular weight (Mv) of the polyethylene is greater than $1\times10^6$; the polyethylene is spherical or sphere-like particles having a mean particle size of 10-100 μm, a standard deviation of 2 μm-15 μm and a bulk density of 0.1 g/mL-0.3 g/mL; the weight percent of the solvent in the polyethylene is more than 0 and less than or equal to 98 wt %.

According to the present invention, the weight percent of the solvent in the polyethylene is more than 0 and less than or equal to 80 wt %, preferably more than 0 and less than or equal to 50 wt %, more preferably 10-50 wt %, still more preferably 20-40 wt %.

According to the present invention, the particle size distribution of the polyethylene is an approximately normal distribution.

According to the present invention, the viscosity average molecular weight (Mv) of the polyethylene is greater than or equal to $1.5 \times 10^6$, preferably $1.5 \times 10^6 - 4.0 \times 10^6$. The molecular weight distribution (Mw/Mn) of the polyethylene is 2-15, preferably 3-10, still preferably 4-8.

According to the present invention, the mean particle size of the polyethylene is preferably 20 μm-90 μm, still preferably 30-85 μm, more preferably 50 μm-80 μm; the standard deviation is preferably 5 μm-15 μm, more preferably 6 μm-12 μm, still more preferably 8 μm-10 μm; the bulk density of the polyethylene is preferably 0.15 g/mL-0.25 g/mL, e.g. 0.2 g/mL.

A thirteenth aspect of the present invention provides a fiber, whose raw material mainly comprises the above-mentioned solubilized ultra-high molecular weight, ultra-fine particle size polyethylene.

According to the present invention, the solubilized ultra-high molecular weight, ultra-fine particle size polyethylene is prepared by above-mentioned method (1) or method (2).

According to the present invention, the raw material also comprises an antioxidant in addition to the solubilized ultra-high molecular weight, ultra-fine particle size polyethylene. Preferably, the added amount of the antioxidant is 0.01-1 part by weight, still preferably 0.02-0.5 part by weight, per 100 parts by weight of the solubilized ultra-high molecular weight, ultra-fine particle size polyethylene. Specifically, the fiber is prepared from the solubilized ultra-high molecular weight, ultra-fine particle size polyethylene containing the antioxidant.

A fourteenth aspect of the present invention provides a method for preparing the above-mentioned fiber, comprising the following steps:

1) dissolving a raw material containing the solubilized ultra-high molecular weight, ultra-fine particle size polyethylene in a solvent to obtain a spinning solution or gel;

2) spinning by the gel spinning method to produce a gel fiber;

3) drawing; producing the fiber.

According to the present invention, in step 1), an antioxidant is added in the dissolution process in order to avoid the degradation of the ultra-high molecular weight polyethylene during dissolution and use. The added amount of the antioxidant is 0.01-1 part by weight, still preferably 0.02-0.5 part by weight, per 100 parts by weight of the solubilized ultra-high molecular weight, ultra-fine particle size polyethylene.

In one embodiment, before the drawing step in step 3), a step of extracting the solvent by a coagulant or an extractant is included. Preferably, the coagulant or extractant is selected from low-boiling organic solvents, e.g., one or more of the following low-boiling organic solvents: petroleum ether, dichloromethane, cyclohexane, etc.

Wherein, the drawing in the step 3) is carried out by a hot-box or hot-rolling drawing method, or a thermal bath drawing method.

For the thermal bath drawing method therein, preferably, the thermal bath medium used comprises one or more components selected from a polyol (preferably having a boiling point of 120° C. to 220° C.), a polyoxyethylene oligomer (preferably having a relative molecular weight of 88-5000 g/mol), a polyoxypropylene oligomer (preferably having a relative molecular weight of 116-1200 g/mol), mineral oil and silicone oil. Preferably, the set temperature $T_L$ of the thermal bath medium is between the glass transition temperature $T_g$ of the polymer matrix and the decomposition temperature $T_d$ of the polymer matrix.

In another embodiment, the step 3) is specifically: the gel fiber via the processes of gel wire drawing, solvent extraction, drying, the first hot-box dry-hot drawing, the second hot-box dry-hot drawing, heat setting, winding, etc., to obtain the fiber of the present invention.

Wherein, the drawing temperature during the gel wire drawing process is 10° C. to 70° C., preferably 25° C. to 50° C.; and the draw multiple is 2-20 times, preferably 3-15 times.

Wherein, the extractant during the process of extracting the solvent is selected from low-boiling organic solvents, such as one or more of the following low-boiling organic solvents:

petroleum ether, dichloromethane, cyclohexane, etc.

Wherein, the drying during the drying process is dried with hot air, and the hot air temperature is 30° C. to 90° C., preferably 40° C. to 80° C.

Wherein, the temperature during the first hot-box dry-hot drawing process is 100° C. to 160° C., preferably 130° C. to 145° C.; and the draw multiple is 1-20 times, preferably 1.5-15 times.

Wherein, the temperature during the second hot-box dry-hot drawing process is 110° C. to 160° C., preferably 130° C. to 145° C.; and the draw multiple is 1-5 times, preferably 1.1-3 times.

Wherein, the temperature during the heat setting process is 100° C. to 150° C., preferably 120° C. to 135° C.

A fifteenth aspect of the present invention provides a film, whose raw material mainly comprises the above-mentioned solubilized ultra-high molecular weight, ultra-fine particle size polyethylene.

According to the present invention, the solubilized ultra-high molecular weight, ultra-fine particle size polyethylene is prepared by the above-mentioned method (1) or the method (2)

According to the present invention, the raw material also comprises an antioxidant in addition to the solubilized ultra-high molecular weight, ultra-fine particle size polyethylene. Preferably, the added amount of the antioxidant is 0.01-1 part by weight, still preferably 0.02-0.5 part by weight, per 100 parts by weight of the solubilized ultra-high molecular weight, ultra-fine particle size polyethylene. Specifically, the film is prepared from the solubilized ultra-high molecular weight, ultra-fine particle size polyethylene containing the antioxidant.

According to the present invention, the film is biaxially stretched.

A sixteenth aspect of the present invention provides a method for preparing the above-mentioned film, comprising the following steps:

1) melt-mixing a raw material containing the solubilized ultra-high molecular weight, ultra-fine particle size polyethylene and a solvent for film formation to obtain a solution;

2) extruding the solution, forming a molded body, cooling, to produce a polymer sheet;

3) biaxially stretching to produce a thin film.

According to the present invention, in step 1), an antioxidant is added in the dissolution process in order to avoid the degradation of the ultra-high molecular weight propylene polymer during dissolution and use. The added amount of the antioxidant is 0.01-1 part by weight, still preferably 0.02-0.5 part by weight, per 100 parts by weight of the solubilized ultra-high molecular weight, ultra-fine particle size polyethylene. Specifically, the raw material consists of the solubilized ultra-high molecular weight, ultra-fine particle size polyethylene and the antioxidant.

A seventeenth aspect of the present invention provides the use of the film as a battery separator.

Advantageous effects of the present invention:

1. The present invention provides a novel method for preparing an ultra-high molecular weight, ultra-fine particle size polyethylene powder by controlling the polymerization temperature of ethylene, the purity of ethylene monomers, and adjusting the preparation steps of catalysts to synthesize the ultra-high molecular weight, ultra-fine particle size polyethylene powder. The method has simple steps, is easy to control, and has a high repeatability, and can realize industrialisation.

The present invention synthesizes a polyethylene powder having both an ultra-high molecular weight and an ultra-fine particle size range for the first time. The study found that the polyethylene powder having the characteristics as described above is particularly suitable for processing applications, and is easily to realize graft modification, thus greatly expanding the application field and the scope of applications of the ultra-high molecular weight polyethylene. Meanwhile, the polyethylene powder also exhibits the following excellent properties, including: firstly, excellent wear resistance, that the wear resistance index is several times higher than those of metals such as carbon steel and copper; secondly, high impact strength, due to the ultra-high molecular weight, and the ultra-long molecular chains; moreover, higher chemical corrosion resistance than that of common polyolefins; finally, wider operating temperature range, that the material maintains good toughness and high strength at lower or higher temperatures.

Therefore, the polyethylene powder prepared by the method of the present invention has excellent processability, and is expected to not only save energy in the process of postforming, film forming and fiber forming, but also can speed up the process and prepare higher performance materials.

2. The present invention provides an ultra-high molecular weight, ultra-fine particle size grafted polyethylene and a solid-phase grafting method thereof. Compared to the prior art, firstly, the selected reaction substrate is an ultra-high molecular weight, ultra-fine particle size polyethylene powder (spherical or sphere-like particles, a mean particle size of 10-100 µm; a standard deviation of 2 µm-15 µm, a bulk density of 0.1-0.3 g/mL; the viscosity average molecular weight (Mv) of the polyethylene is greater than $1 \times 10^6$), which has smaller particle size, higher molecular weight and higher specific surface area than common polyethylene particles (greater than 400 µm), so that there are more reaction sites for the grafting monomers, and thus an effective grafting rate of the prepared grafted polyethylene is relatively high. Secondly, the method provided by the present invention does not require complicated pretreatment of the raw materials, and does not need to design the specific reaction equipment, as compared with other methods for preparing high grafting rate grafted polyethylene. Finally, the method for preparing high grafting rate grafted polyethylene by solid-phase grafting provided by the present invention has the advantages of simple process, low cost, simple operation and easy industrialized production.

The experimental results show that the ultra-high molecular weight, ultra-fine particle size grafted polyethylene particles prepared by the method of the invention have obvious improvement in thermal properties, mechanical properties, polarity and so on, and maintain the original excellent performance of the polyethylene. The crystallization temperature of the grafted polyethylene is at least 8° C. higher than that of the base polymer, the effective grafting rate is greater than or equal to 0.5% (for example, can reach 5.5%), and the water contact angle of the grafted polyethylene is less than or equal to 88° (for example, 80-88°), while the water contact angle of the base polymer is generally more than 95°. It can be seen that the hydrophilicity and polarity of the grafted polyethylene of the present invention are remarkably improved.

3. The present invention provides a glass fiber reinforced polyethylene composition. The sheet or pipe prepared from the composition has excellent low-temperature resistance (e.g. long-term use at minus 30° C. to minus 135° C.), high impact resistance (e.g. the charpy notched impact strength (7.5 J) higher than 10.0 KJ/m$^2$) and creep resistance (e.g. creep less than or equal to 2%). In addition, the mechanical properties (such as bending strength, bending modulus, tensile strength, heat distortion temperature, etc.) of the sheet or pipe are also excellent due to the reinforcing effect of glass fibers. Therefore, the sheet of the present invention is particularly suitable for use in many fields such as automobiles, electronic devices, etc., and the pipe is particularly suitable for use in the fields of water supply and drainage, oil drilling, etc.

4. The present invention provides a novel method for preparing a solubilized ultra-high molecular weight, ultra-fine particle size polyethylene by controlling the polymerization temperature of ethylene, the purity of ethylene monomers, adjusting the preparation steps of the catalyst and introducing a dispersing medium into the polymerization system to synthesize the solubilized ultra-high molecular weight, ultra-fine particle size polyethylene. The method has simple steps, is easy to control, and has a high repeatability, and can realize industrialisation.

The present invention is the first synthesis of a polyethylene simultaneously having solubilization, ultra-high molecular weight and ultra-fine particle size range. The study found that the polyethylene having the characteristics as described above is particularly suitable for processing applications, and is easily grafted, thus greatly expanding the application field and the scope of applications of the ultra-high molecular weight polyethylene. Meanwhile, the polyethylene also exhibits the following excellent properties, including: firstly, excellent wear resistance, that the wear resistance index is several times higher than those of metals such as carbon steel and copper; secondly, high impact strength, due to the ultra-high molecular weight, the ultra-long molecular chains; moreover, higher chemical corrosion resistance than that of common polyolefins; furthermore, relatively wide operating temperature range, that the material maintains good toughness and high strength at lower or higher temperatures; finally, low energy consumption and short process time in the process of postforming, film forming and fiber forming (for example, completely dissolved at lower temperatures, or rapidly dissolved at higher temperatures in a relatively short time, thereby effectively reducing or decreasing polymer degradation while shortening the dissolution process).

Therefore, the polyethylene prepared by the method of the invention has excellent processability, and is expected to not only save energy in the process of postforming, film forming and fiber forming, but also can speed up the process and prepare higher performance materials.

5. In the fiber of the present invention, a solubilized ultra-high molecular weight, ultra-fine particle size polyethylene is selected as a raw material. Because the polyethylene is easily dissolved and has a lower dissolution temperature, it is particularly suitable for processing applications, and especially for wet spinning processing of the fiber.

The fiber of the present invention exhibits excellent creep resistance, and extremely wide operating temperature range (suitable for both lower temperature and higher temperature) because the solubilized ultra-high molecular weight, ultra-fine particle size polyethylene is used as a raw material.

6. In the film of the present invention, a solubilized ultra-high molecular weight, ultra-fine particle size polyethylene is selected as a raw material. Due to the ultra-high molecular weight of the raw material, the performance of the products is greatly improved. Meanwhile, the solvent contained in the raw material limits the degree of crystallization of the polyethylene, so that the polyethylene is easily melted and dissolved at a lower temperature during processing, which solves the problem that the conventional ultra-high molecular weight polyethylene is easily degraded during processing. Therefore, the polyethylene is particularly suitable for processing applications, and especially for the hot pressing and the stretching processing of the film.

The film of the present invention exhibits excellent creep resistance, and extremely wide operating temperature range (suitable for both lower temperature and higher temperature) because the solubilized ultra-high molecular weight, ultra-fine particle size polyethylene is used as a raw material.

EXAMPLES

Preparation Method of Catalyst

Figure 1:
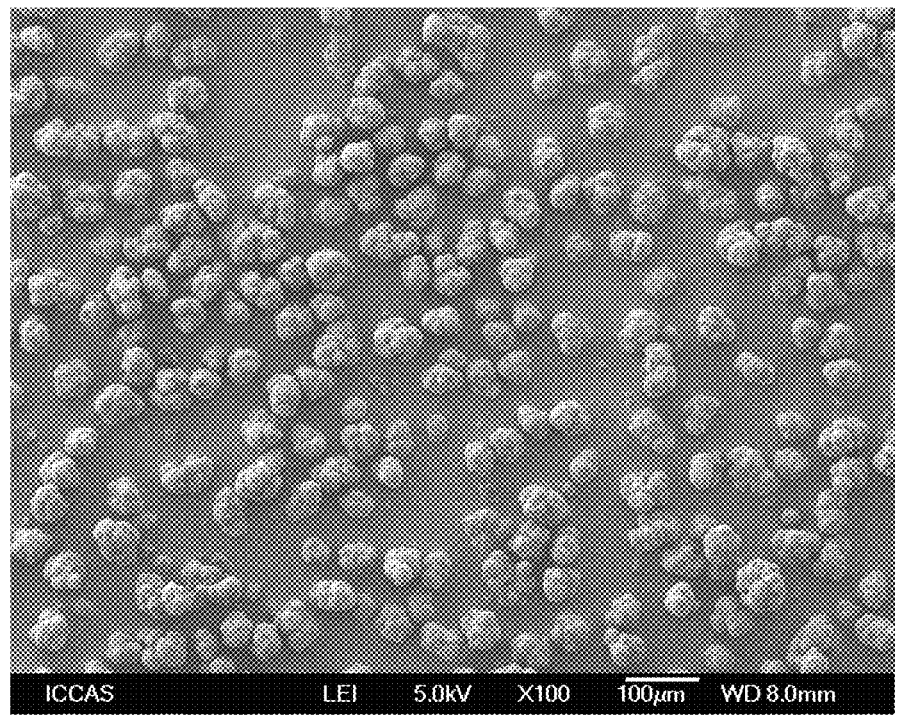
FIG. 1 is a scanning electron micrograph of the polyethylene particles of Example 1.3.

The catalyst used in the preparation method of the present invention can be prepared by the method disclosed in an already-filed patent application by the applicant (Application No. 201510271254.1), which is incorporated by reference in its entirety.

As described above, in the preparation method of the ultra-high molecular weight, ultra-fine particle size polyethylene powder and the solubilized ultra-high molecular weight, ultra-fine particle size polyethylene in the present invention, the catalyst used is prepared by a method comprising the following steps:

(a) mixing a magnesium halide, an alcohol compound, an auxiliary agent, a part of internal electron donor compound and a solvent to prepare mixture I;

(b) adding the aforementioned mixture I into a reactor, preheating to −30° C.-30° C., adding an titanium compound dropwise; or, adding the titanium compound into the reactor, preheating to −30° C.-30° C., adding the aforementioned mixture I dropwise;

(c) after the completion of the dropwise addition, raising the temperature of the reaction system to 90° C.-130° C. for 0.5-3 hours, adding the rest internal electron donor compound, and continuously reacting;

(d) filtering off the liquid of the reaction system, adding the rest titanium compound, and continuously reacting;

(e) after the completion of the reaction, obtaining the catalyst by using post-treatment;

According to the present invention, the step (b) is replaced by the following step (b'):

(b') preparing mixture II containing nanoparticles, a dispersant and a solvent; adding the aforementioned mixture I and mixture II into the reactor to obtain a mixture, preheating to −30° C. to 30° C., adding an titanium compound dropwise; or, adding the titanium compound into the reactor, preheating to −30° C. to 30° C., and adding the mixture of the aforementioned mixture I and mixture II dropwise.

In the present invention, mixture I is preferably prepared by the following method: mixing a magnesium halide and an alcohol compound in an organic solvent, heating and maintaining the temperature, and then adding an auxiliary agent and a part of the internal electron donor compound to obtain a stable homogeneous mixture I after the reaction at a certain temperature.

The alcohol compound is one or more selected from a $C_1$-$C_{15}$ fatty alcohol compound, a $C_3$-$C_{15}$ cycloalkanol compound, and a $C_6$-$C_{15}$ aromatic alcohol compound, preferably one or more of methanol, ethanol, glycol, n-propanol, isopropanol, 1,3-propanediol, butanol, isobutanol, hexanol, heptanol, n-octanol, isooctanol, nonanol, decanol, sorbitol, cyclohexanol or benzyl alcohol, more preferably ethanol, butanol, hexanol and isooctanol.

The internal electron donor is at least one of a monoester, a diester, a monoether, and a diether compound, preferably a diester or a diether. Specifically it is selected from the group consisting of aromatic carboxylic acid diester, 1,3-diether, malonic ester, succinate, glutarate, glycol ester, such as diisobutyl phthalate, di-n-butyl phthalate, 1,3-diether compound, 9,9-di(methoxymethyl)fluorene, di-n-butyl 2-isopropylmalonate, diethyl 2-decylmalonate, diethyl 2-methyl-2-isopropylmalonate, diisobutyl diisopropylsuccinate, diethyl 2,3-diisopropylsuccinate, β-substituted glutarates, 1,3-diol ester, etc. The aforementioned internal electron donors are disclosed in the following patents or applications: CN1453298, CN1690039, EP1840138, CN101423566, CN101423570, CN101423571, CN101423572, CN1986576, CN1986576, CN101125898, CN1891722, WO2007147864, CN1831017, CN101560273, EP 2029637, EP2029642, CN1330086, CN1463990, CN1397568, CN1528793, CN1732671, CN1563112, CN1034548, CN1047302, CN1091748, CN1109067, CN94103454, CN1199056, EP03614941990, EP03614931990, WO002617, etc.

The solvent is at least one selected from the group consisting of a linear alkane in the $C_5$-$C_{20}$ range, a branched alkane in the $C_5$-$C_{20}$ range, an aromatic hydrocarbon in the $C_6$-$C_{20}$ range or their halogenated hydrocarbons, preferably at least one of toluene, chlorobenzene, dichlorobenzene or decane.

In the present invention, magnesium halide, which serves as a carrier in the preparation of a catalyst for directly obtaining submicron-sized polyolefin particles, is one of the components of the conventional Ziegler-Natta catalyst, and the catalyst is prepared in a suitable shape, size and mechanical strength. Meanwhile, the active components can disperse on the carrier surface to obtain a higher specific surface area, thus improving the catalytic efficiency of the active components per unit mass. Furthermore, an alcohol compound is used to dissolve the carrier, i.e. magnesium halide. In the preparation of the mixture I, the temperature of the mixed solution is preferably 110-130° C., more preferably 130° C. The isothermal holding time is preferably 1-3 hours, more preferably 2-3 hours. The reaction time, after adding auxiliaries and so on, is 0.5-2 hours, more preferably 1 hour. Therefore, magnesium halide is dissolved by the alcohol compound at a high temperature to obtain the mixture I.

According to the present invention, the mixture II is preferably prepared by the following method: adding nanoparticles, a dispersant and a solvent to a reaction vessel and sonicating to obtain a homogeneous mixture II. The nanoparticles are preferably at least one selected from nano silicon dioxide, nano titanium dioxide, nano zirconium dioxide, nano nickel oxide, nano magnesium chloride or nano carbon spheres, more preferably nano silicon dioxide, nano titanium dioxide. The particle size of the nanoparticles is preferably 1-80 nm, more preferably 10-50 nm. The added amount of the nanoparticles is preferably 0%-200%, more preferably 0%-20%, relative to the added amount of the magnesium halide. The time of ultrasound treatment is preferably 2 hours. In the present invention, the nanoparticles are added as seed crystals in order to accelerate the carrier formation and reduce the catalyst particle size; the dispersant and solvent, including the ultrasound treatment, are all used to assist nanoparticle dispersion, thus promoting each nanoparticle to be as a seed crystal.

According to the present invention, in the mixture II in step (b'), the nanoparticles are at least one selected from nano silicon dioxide, nano titanium dioxide, nano zirconium dioxide, nano nickel oxide, nano magnesium chloride or nano carbon spheres.

Preferably, the particle size of the nanoparticles is 1-80 nm, preferably 2-60 nm, more preferably 3-50 nm.

The added amount of the nanoparticles is larger than 0% and less than or equal to 200%, preferably in a range between larger than 0% and less than or equal to 20%, relative to the added amount of the magnesium halide.

In the present invention, in the mixture II in step (b'), the solvent is at least one selected from the group consisting of a linear alkane in the $C_5$-$C_{20}$ range, a branched alkane in the $C_5$-$C_{20}$ range, an aromatic hydrocarbon in the $C_6$-$C_{20}$ range or their halogenated hydrocarbons.

The dispersant is selected from the group consisting of titanium tetrachloride, silicon tetrachloride or a mixture thereof.

In step (a), the mixing with heating and stirring is carried out to obtain a homogenously stable transparent mixture I.

In step (b'), ultrasonic dispersion treatment is carried out during preparing mixture II.

In step (b) or (b'), the dropwise addition is a slow dropwise addition.

In step (b) or (b'), the preheating temperature is preferably −20° C. to 30° C., more preferably −20° C. to 20° C.

The reaction time in step (c) is 1-5 hours, preferably 2-3 hours.

The continue reaction time in step (d) is 1-5 hours, preferably 2-3 hours.

The post-treatment in step (e) can be that the obtained product is washed with hexane and then dried; wherein the number of washings is 1-10 times, preferably 3-6 times.

In step (a), magnesium halide is at least one selected from the group consisting of magnesium chloride, magnesium bromide, and magnesium iodide.

In step (a), the auxiliary agent is a titanate compound.

In step (b) or (b'), the formula of the titanium compound is as shown in Formula I:

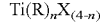

$$Ti(R)_nX_{(4-n)} \qquad \text{Formula I}$$

wherein, R is a branched or linear chain $C_1$-$C_{12}$ alkyl group, X is halogen, and n is 0, 1, 2 or 3.

In step (d), preferably, the reaction system is heated to 90° C. to 130° C. over a period of 40 minutes to 3 hours, more preferably, the reaction system is heated to 100° C. to 120° C. over a period of 40 minutes to 2 hours.

It can be seen from the above resolution that the preparation method of the Ziegler-Natta catalyst according to the present invention is simple-processing and is easy to industrialize. Moreover, when ethylene is polymerized, the Ziegler-Natta catalyst prepared by the present invention can be used to produce polyethylene particles having a mean particle size of 10-100 μm, high sphericity, a narrow particle size distribution, and a low bulk density (0.1-0.3 g/mL). It is found that the obtained polyethylene particles prepared by using the catalyst prepared by the present invention have particle sizes reduced by 20-30 times, a significantly narrower particle size distribution and a bulk density as low as 0.1 g/mL compared to other polyethylene.

Preparation Method of an Ultra-High Molecular Weight, Ultra-Fine Particle Size Polyethylene Powder;

As described above, the present invention provides a method for preparing an ultra-high molecular weight, ultrafine particle size polyethylene powder, which comprises the following steps: under the action of a catalyst, carrying out ethylene polymerization, wherein the polymerization temperature is −20 to 100° C.; in ethylene, a content of carbon monoxide is less than 5 ppm, a content of carbon dioxide is less than 15 ppm, and a content of conjugated diene is less than 10 ppm;

the catalyst is prepared by the above-mentioned method for preparing the catalyst.

The present invention found that the simply controlled the preparation method of the catalyst can indeed achieve good control over the particle size of the powder, but the molecular weight of the prepared polyethylene is not high. In order to achieve particle size control while increasing the molecular weight of the polymer, the inventors have made many attempts. It is found that controlling the temperature of the polymerization reaction and the purity of the monomer is a simple and effective method, and does not affect the effective control over the particle size of the polymer, and even is helpful to prepare the polymer with a narrower particle size distribution and a lower bulk density range.

It is found that the polymerization temperature is controlled at −20 to 100° C., and purity control of ethylene is that a content of carbon monoxide is less than 5 ppm, a content of carbon dioxide is less than 15 ppm, and a content of conjugated diene is less than 10 ppm, which can achieve particle size control while preparing ultra-high molecular weight polyethylene. Preferably, the polymerization temperature is 30-80° C., more preferably 50-80° C.

Ultra-High Molecular Weight, Ultra-Fine Particle Size Polyethylene Powder

As described above, the present invention provides an ultra-high molecular weight, ultra-fine particle size polyethylene powder.

The ultra-high molecular weight polyethylene having the particle sizes and the bulk density is particularly suitable for graft modification, for one thing, it greatly expands the scope of the polyethylene modification, for another, the processing performance of the polymer is remarkably improved to be suitable for the preparation of a wider range of products. Thus, the application field of the polymer is effectively expanded.

The ultra-high molecular weight ultra-fine particle size polyethylene powder of the present invention also exhibits the following excellent properties, including: firstly, excellent wear resistance, that the wear resistance index is several times higher than those of metals such as carbon steel and copper; secondly, high impact strength, due to the ultra-high molecular weight, the ultra-long molecular chains; moreover, higher chemical corrosion resistance than that of common polyolefins; finally, wider operating temperature range, which can maintain good toughness and high strength at lower or higher temperatures.

Solid-Phase Grafting Method for Preparing a Grafted Polyethylene with Relatively High Grafting Rates As described above, the present invention provides a method for preparing an ultra-high molecular weight, ultra-fine particle size grafted polyethylene by a solid-phase grafting method.

In a preferred embodiment of the present invention, the grafted polyethylene was prepared as follows:

in the container, adding the polyethylene powder with a viscosity average molecular weight (Mv) of greater than $1\times10^6$, a mean particle size of 10 μm-100 μm (preferably 20 μm-80 μm, more preferably 50 μm-80 μm), a standard deviation of 2 μm-15 μm (preferably 5 μm-15 μm, more preferably 6 μm-12 μm, still more preferably 8 μm-10 μm), and a bulk density of 0.1 g/mL-0.3 g/mL (preferably in the range of 0.15 g/mL-0.25 g/mL);

adding an azo initiator or a peroxide initiator (e.g. benzoyl peroxide) in an amount of 0.1-10 wt % by weight of the polyethylene powder, preferably 2-9 wt %, more preferably 3-8 wt %;

adding a grafting monomer selected from a siloxane-based compound or a vinyl-based unsaturated compound, of which the vinyl-based unsaturated compound is, for example, a styrene-based compound, a vinyl-based unsaturated organic acid, a vinyl-based unsaturated organic ester, a vinyl-based unsaturated organic acid anhydride, or a mixture thereof, more preferably one or more selected from acrylic acid (AA), maleic anhydride (MAH), methyl methacrylate (MMA), styrene (St); a siloxane-based compound is, for example, vinyltrimethylsilane, vinyltriethylsilane, divinyldimethylsilane, (triethylsilyl)acetylene, allyltrimethylsilane, etc., preferably one or two selected from vinyltrimethylsilane and vinyltriethylsilane; the added amount of grafting monomer is in an amount of 0.2-15 wt % by weight of the polyethylene powder, preferably 0.5-12 wt %, more preferably 1-9 wt %;

adding an interface agent, preferably one or more selected from among benzene, toluene, xylene, tetrahydrofuran, diethyl ether, acetone, hexane, heptanes, more preferably one or more selected from among toluene, xylene, tetrahydrofuran, diethyl ether, acetone. For example, it is xylene or a mixture of xylene and tetrahydrofuran; the added amount of interface agent is in an amount of 0.1-30 wt % by weight of the polyethylene powder, preferably 10-25 wt %.

After the completion of addition of the raw materials, the high-speed mechanical stirring was carried out, and the stirring time was related to the efficiency of the stirring paddle. The aims of the stirring were to homogenously mix the reactants, to make the grafting reaction more completely and to minimize self-polymerization of the grafting monomers. Therefore, the stirring time was uncertain, and usually 0.5-5 hours, preferably 1-5 hours, more preferably 3-5 hours. The solid-phase grafting reaction was carried out by heating, and the grafting reaction conditions were at 60 to 120° C. for 0.5-5 hours, preferably at 70 to 110° C. for 0.5-3.5 hours, more preferably at 85 to 110° C. for 2-3 hours. After the completion of the reaction, the product was a grafted polyethylene having a high grafting rate.

Preparation Method of a Solubilized Ultra-High Molecular Weight, Ultra-Fine Particle Size Polyethylene As described above, the present invention provides a method for preparing a solubilized ultra-high molecular weight, ultra-fine particle size polyethylene.

The present invention found that the simply controlled the preparation method of the catalyst can indeed achieve good control over the particle size of the polyethylene, but the molecular weight of the prepared polyethylene is not high. In order to achieve particle size control while increasing the molecular weight of the polymer, the inventors have made many attempts. It is found that controlling the temperature of the polymerization reaction and the purity of the monomer is a simple and effective method, and does not affect the effective control over the particle size of the polymer, and even is helpful to prepare the polymer with a narrower particle size distribution and a lower bulk density range.

It is found that the polymerization temperature is controlled at −20 to 100° C., and purity control of ethylene is that a content of carbon monoxide is less than 5 ppm, a content of carbon dioxide is less than 15 ppm, and a content of conjugated diene is less than 10 ppm, which can achieve particle size control while preparing ultra-high molecular weight polyethylene. Preferably, the polymerization temperature is 0 to 90° C., preferably 10 to 85° C., still preferably 30 to 80° C., more preferably 50 to 80° C.

In addition, in order to further improve the processability of the ultra-high molecular weight, ultra-fine particle size polyethylene, a solubilization method is further introduced in the present invention, that is, the present invention introduces a dispersion medium or a dispersion medium and a solvent in the process of preparing polyethylene. The presence of these small molecules enables the crystal zone size of the obtained polyethylene to greatly be reduced, molecular chains to more easily move and heats to be more easily transferred in the subsequent dissolution or melt processing of products, so that the obtained polyethylene can be rapidly dissolved or melted at a lower temperature, thereby shortening the process. Furthermore, it can also significantly reduce the polyethylene degradation by decreasing the dissolution or melting temperature, which is very critical for ensuring its molecular weight and obtaining high performance polyethylene products.

Solubilized Ultra-High Molecular Weight, Ultra-Fine Particle Size Polyethylene

As described above, the present invention provides a solubilized ultra-high molecular weight, ultra-fine particle size polyethylene.

The ultra-high molecular weight polyethylene having the particle sizes, the bulk density and solvent content is particularly suitable for graft modification, for one thing, it greatly expands the scope of the polyethylene modification, for another, the processing performance of the polymer is remarkably improved to be suitable for the preparation of a wider range of products. Thus, the application field of the polymer is effectively expanded.

Meanwhile, the polyethylene of the present invention also exhibits the following excellent properties, including: 1) excellent wear resistance, that the wear resistance index is several times higher than those of metals such as carbon steel and copper; 2) high impact strength, due to the ultra-high molecular weight, the ultra-long molecular chains; 3) higher chemical corrosion resistance than that of common polyolefins; 4) wider operating temperature range, which can maintain good toughness and high strength at lower or higher temperatures; 5) low energy consumption and short process time in the process of postforming, film forming and fiber forming.

Fiber and Preparation Method Thereof

As described above, the present invention provides a fiber and a preparation method thereof.

In a preferred embodiment of the present invention, in step (1), dissolving and mixing a mixture containing the solubilized ultra-high molecular weight, ultra-fine particle size polyethylene with a solvent to obtain a spinning solution or gel. In the present invention, the solvent is an organic solvent capable of dissolving the polyethylene, for example, decahydronaphthalene, white oil, etc. The content of the polymer in the spinning solution or gel is 3-20 wt %, preferably 5-15 wt %.

In a preferred embodiment of the present invention, in step (2), the solution gel spinning method is taken as an example, which specifically comprises the following steps: mixing a solubilized ultra-high molecular weight, ultra-fine particle size polyethylene with a solvent to obtain a mixture; dissolving and extruding the mixture through a twin-screw extruder (preferably, the temperature of the dissolution extrusion is 120-270° C., preferably 150-240° C.) to obtain a spinning solution; directly extruding the spinning solution with a twin-screw extruder through a spinning assembly and a spinneret, and passing through a coagulation bath (for example, a cooling water bath; preferably, the water bath temperature is 0-15° C., preferably 2-10° C.) to obtain a gel fiber; the gel fiber being via the processes of gel wire drawing, solvent extraction, drying, first hot-box dry-hot drawing, second hot-box dry-hot drawing, heat setting, winding, etc., to obtain the fiber of the present invention. According to the present invention, the raw material also comprises an antioxidant in addition to the solubilized ultra-high molecular weight, ultra-fine particle size polyethylene. Preferably, the added amount of the antioxidant is 0.01-1 part by weight, still preferably 0.02-0.5 part by weight, per 100 parts by weight of the solubilized ultra-high molecular weight, ultra-fine particle size polyethylene. Specifically, the fiber is prepared from the solubilized ultra-high molecular weight, ultra-fine particle size polyethylene containing the antioxidant.

In the present invention, the mixture comprises an antioxidant in addition to the polyethylene. Preferably, the added amount of the antioxidant is 0.01-1 part by weight, still preferably 0.02-0.5 part by weight, per 100 parts by weight of the polyethylene. Specifically, the mixture consists of the solubilized ultra-high molecular weight, ultra-fine particle size polyethylene and the antioxidant. The antioxidant is an antioxidant for polyethylene known in the art, non-limiting. The antioxidant is composed of a primary antioxidant and a secondary antioxidant, wherein the primary antioxidant is selected from hindered phenolic antioxidants, and the secondary antioxidant is selected from the group consisting of thiodipropionate or phosphite, etc. The hindered phenolic antioxidants are some sterically hindered phenolic compounds, which exhibit a remarkably improved resistance to thermal oxidation, and do not pollute the products. This type of antioxidant has many varieties, mainly including 2,6-di-tert-butyl-4-methylphenol, bis(3,5-di-tert-butyl-4-hydroxybenzyl) sulfide, pentaerythritol tetrakis(β-(3,5-di-tert-butyl-4-hydroxyphenyl)propionate), etc. The thiodipropionate is a secondary antioxidant, which is often used together with a hindered phenolic antioxidant, and the effect is remarkable, for example, didodecyl thiodipropionate, ditetradecyl thiodipropionate or distearyl thiodipropionate. The phosphite is also a secondary antioxidant, mainly including trioctyl phosphite, tridecyl phosphite, tris(dodecanol) phosphite, and tris(hexadecanol) phosphite, etc.

The fiber of the present invention has excellent mechanical properties and creep resistance, and also has a wider use temperature range. Specifically, the fiber of the present invention has the following properties: fineness (dtex) of 1.5-3.0, breaking strength of greater than or equal to 2.0-3.5 GPa, modulus of 95-220 GPa, elongation at break of 3.0-4.5%, creep value of less than or equal to 2% (e.g. 1.0%-2.0%), crystallinity of 95%, melting point of 130° C. to 140° C., use temperature range of −30° C. to 135° C.

Film and Preparation Method Thereof

As described above, the present invention provides a film and a preparation method thereof.

In a preferred embodiment of the present invention, the melt-mixing in step (1) is achieved by a twin-screw extruder, which is well known and will not be described in detail herein. In the solution, the weight percent of the polyethylene is 20-50 wt %, preferably 30-40 wt %. The solvent for film formation is at least one selected from cyclohexane, n-hexane, n-heptane, nonane, decane, undecane, dodecane, benzene, toluene, xylene, dichlorobenzene, trichlorobenzene, 1,1,1-trichloroethane, white oil, liquid paraffin, kerosene, olefin mineral oil and decahydronaphthalene. Wherein, the temperature of the melt-mixing varies depending on the polymer and the solvent, and is generally in the range of 130-280° C.

In a preferred embodiment of the present invention, step (2) is specifically that the solution of step (1) is extruded from a mold to form a molded body (such as a sheet) during supplying the solution to a mold through an extruder, and a polymer sheet is obtained after cooling by a cooling drum. The surface temperature of the cooling drum is set to 20-40° C., and the cooling rate of the molded body through the cooling drum is more than 20° C./s.

In a preferred embodiment of the present invention, the biaxial stretching in step (3) is that stretching the polymer sheet of step (2) is performed in the transverse direction (width direction, TD) and the longitudinal direction (machine direction MD) according to a certain multiple (transverse stretching multiple and longitudinal stretching multiple) by a usual stretching machine method, a drum method, or a combination thereof. In the present invention, the preferable transverse stretching multiple and longitudinal stretching multiple are 4-5 times, respectively, and preferably, the transverse stretching multiple is the same as the longitudinal stretching multiple.

Furthermore, the content of the polymer in the raw material is 3-20 wt %, preferably 5-15 wt %. Moreover, an antioxidant is added in the raw material. Preferably, the added amount of the antioxidant is 0.01-1 part by weight, still preferably 0.02-0.5 part by weight, per 100 parts by weight of the polyethylene. The antioxidant is an antioxidant for polyethylene known in the art. Non-limiting, the antioxidant is composed of a primary antioxidant and a secondary antioxidant, wherein the primary antioxidant is selected from hindered phenolic antioxidants, and the secondary antioxidant is selected from the group consisting of thiodipropionate or phosphite, etc. The hindered phenolic antioxidants are some sterically hindered phenolic compounds, which exhibit a remarkably improved resistance to thermal oxidation, and do not pollute the products. This type of antioxidant has many varieties, mainly including 2,6-di-tert-butyl-4-methylphenol, bis(3,5-di-tert-butyl-4-hydroxybenzyl) sulfide, pentaerythritol tetrakis(β-(3,5-di-tert-butyl-4-hydroxyphenyl)propionate), etc. The thiodipropionate is a secondary antioxidant, which is often used together with a hindered phenolic antioxidant, and the effect is remarkable, for example, didodecyl thiodipropionate, ditetradecyl thiodipropionate or distearyl thiodipropionate. The phosphite is also a secondary antioxidant, mainly including trioctyl phosphite, tridecyl phosphite, tris(dodecanol) phosphite, and tris(hexadecanol) phosphite, etc.

Determination of Properties and Parameters

The properties of the sheets and pipes of the present invention are determined by measurement methods according to well-known standards.

For example, creep resistance is determined in accordance with the Chinese National Standard GB11546-89 and ISO899-1981. Impact resistance is determined according to GB/T1043.1-2008. Bending strength and bending modulus are measured according to GB/T9341-2008. Tensile strength is measured according to GB/T1040-2006. Heat distortion temperature is measured according to GB/T1634.2-2004.

Characterization methods of the grafted polyethylene of the present invention:

IR characterization of the grafted polyethylene: take a small amount of sample and press into a film with a flat vulcanizer, and then record infrared spectra with a NICO-LET 560-type FTIR.

Water Contact Angle Measurement: take a small amount of sample and press into a film with a flat vulcanizer. Deposit a drop of distilled water on a sample stage in order to allow the sample film adhering tightly to the sample stage. Extract a 2 μL of deionized water with a micro-injector and inject on the sample film. Measure water contact angles after 10 seconds.

Determination method of the effective grafting rate of grafted polyethylene: weigh 1 g of the dried and purified grafted sample accurately, place in a 250 mL flask, add 80 mL of xylene, and heat under reflux until dissolved. After cooling, add an excess amount of a 0.1 mol/L KOH-ethanol solution and heat the mixture under reflux for 2 h. After cooling, use phenolphthalein as an indicator and titrate with a 0.1 mol/L HCl-isopropanol solution. Record the added amount of alkali and the consumed amount of acid for neutralization, and calculate the effective grafting rate of a solid-phase grafting reaction product by the following equation.

$$G = \frac{c_1 V_1 - c_2 V_2}{a \times m} \times M \times 100\%$$

Wherein: G is the effective grafting rate of the product; $c_1$ is the concentration of a KOH-ethanol solution, mol/L; $V_1$ is the volume of the KOH-ethanol solution added in excess, mL; $c_2$ is the concentration of a HCl-isopropanol solution, mol/L; $V_2$ is the volume of the HCl-isopropanol solution consumed for titration neutralization of alkali, mL; a is the functionality of the grafting monomer involved in the neutralization reaction; m is the mass of the purified sample, g; M is the relative molecular weight of the monomer.

The properties of the fibers and the films of the present invention are determined by measurement methods according to well-known standards.

For example, creep resistance is determined in accordance with the measurement method of the Chinese National Standard GB 11546-89 and ISO 899-1981.

In order to make the object, technical schemes and advantages of the present invention clearer, the present invention is further described in detail hereinafter with reference to the specific embodiments and accompanying drawings. However, it is understood by those skilled in the art that the present invention is not limited to the drawings and the following embodiments.

Preparation Example 1 (Preparation of Catalyst)

In the reactor completely purged with high purity nitrogen gas, 4.94 g of anhydrous magnesium chloride, 18.9 g of isooctanol, and 30 ml of decane were sequentially added, the temperature was raised to 130° C. with stirring, and maintained for 2 hours, and then 2.65 g of tetrabutyl titanate and 2.05 g of diisobutylphthalate was added, further reacted at 130° C. for 1 hour and finally cooled to room temperature to obtain a homogeneous transparent solution, i.e. mixture I.

To the reactor, 200 ml of titanium tetrachloride was added and stirred, preheated to 0° C., and mixture I was added dropwise to titanium tetrachloride in about 2 hours. After the addition was complete, the temperature began to increase and increased to 110° C. in 2 hours. 1.23 g of an internal electron donor diisobutyl phthalate was added. After reacting at this temperature for 2 hours, the reaction liquid was removed, 200 ml of titanium tetrachloride was again added, and the reaction was carried out for 2 hours. Finally, the reaction liquid was removed, and the remaining solids were washed with hexane 10 times at 60° C., and dried to obtain a catalyst.

Example 1.1 Ethylene Slurry Polymerization

Under the protection of high purity nitrogen, a 1 L high pressure reactor was dried and deoxidized. 150 mL of n-Hexane, 20 mg of the catalyst prepared as described in the above Preparation Example 1 and 12 ml of triethyl aluminum were sequentially added, and then ethylene gas was fed into the reactor to keep the reactor pressure at 0.7 MPa; wherein, in ethylene, the content of carbon monoxide was less than 5 ppm, the content of carbon dioxide was less than 15 ppm, and the content of conjugated diene was less than 10 ppm; the polymerization reaction started, the system temperature was maintained at 80° C., and the reaction time was 30 minutes. The catalyst activity and the properties of the polyethylene are shown in Table 1.

Example 1.2 Ethylene Slurry Polymerization

Under the protection of high purity nitrogen, a 1 L high pressure reactor was dried and deoxidized. 150 mL of n-Hexane, 20 mg of the catalyst prepared as described in the above Preparation Example 1 and 12 ml of triethyl aluminum were sequentially added, and then ethylene gas was fed into the reactor to keep the reactor pressure at 0.7 MPa; wherein, in ethylene, the content of carbon monoxide was less than 5 ppm, the content of carbon dioxide was less than 15 ppm, and the content of conjugated diene was less than 10 ppm; the polymerization reaction started, the system temperature was maintained at 70° C., and the reaction time was 30 minutes. The catalyst activity and the properties of the polyethylene are shown in Table 1.

Example 1.3 Ethylene Slurry Polymerization

Under the protection of high purity nitrogen, a 1 L high pressure reactor was dried and deoxidized. 150 mL of n-Hexane, 20 mg of the catalyst prepared as described in the above Preparation Example 1 and 12 ml of triethyl aluminum were sequentially added, and then ethylene gas was fed into the reactor to keep the reactor pressure at 0.7 MPa; wherein, in ethylene, the content of carbon monoxide was less than 5 ppm, the content of carbon dioxide was less than 15 ppm, and the content of conjugated diene was less than 10 ppm; the polymerization reaction started, the system temperature was maintained at 50° C., and the reaction time was 30 minutes. The catalyst activity and the properties of the polyethylene are shown in Table 1.

FIG. 1 is a scanning electron microscopy image of the polyethylene prepared in Example 1.3. It can be seen from FIG. 1 that all of the polyethylene particles exhibit good sphericity, spherical or spheroidal, and have a uniform particle size distribution and smaller average particle diameter.

Comparative Example 1.1 Ethylene Bulk Polymerization

Under the protection of high purity nitrogen, a 1 L high pressure reactor was dried and deoxidized. 150 mL of n-Hexane, 20 mg of the catalyst prepared as described above and 12 ml of triethyl aluminum were sequentially added, and then ethylene gas was fed into the reactor to keep the reactor pressure at 0.7 MPa; wherein, in ethylene, the content of carbon monoxide was more than 10 ppm, the content of carbon dioxide was more than 20 ppm, and the content of conjugated diene was more than 20 ppm; the polymerization reaction started, the system temperature was maintained at 110° C., and the reaction time was 30 minutes. The catalyst activity and the properties of the polyethylene are shown in Table 1.

TABLE 1

The catalyst activity of the Ziegler-Natta catalyst prepared in Preparation Example 1 and the properties of the polyethylene obtained in Examples 1.1-1.3

| | | Properties of polyethylene | | | | |
|---|---|---|---|---|---|---|
| Example | Catalyst activity g PP/ (g · cat · h) | Mean particle size μm | Standard deviation μm | Bulk density g/ml | Viscosity average molecular weight ×10$^6$ g/mol | Molecular weight distribution |
| Example 1.1 | 4000 | 85 | 8.21 | 0.22 | 1.3 | 9.2 |
| Example 1.2 | 3400 | 76 | 8.22 | 0.18 | 1.7 | 6.5 |
| Example 1.3 | 2700 | 45 | 8.18 | 0.16 | 2.7 | 3.1 |
| Comparative Example 1.1 | 4500 | 110 | 8.24 | 0.31 | 0.5 | 12.1 |

Other properties of the polyethylene obtained in Example 1.3 and Comparative Example 1.1 were further determined in the present invention. It was found that (1) the wear resistance index of the polyethylene in Example 1.3 was several times higher than that of common carbon steel or copper, while the wear resistance index of the polyethylene in Comparative Example 1.1 was slightly lower; (2) the impact strength of the polyethylene in Example 1.3 was higher than 10 KJ/m$^2$, while the impact strength in Comparative Example 1.1 was around 3 KJ/m$^2$; (3) chemical corrosion resistance of the polyethylene powder in Example 1.3 was better than that of common polyolefin, while the polyethylene powder in Comparative Example 1.1 was easily degradable under acidic conditions; (4) operating temperature range of the polyethylene powder in Example 1.3 was wider, which can maintain good toughness and high strength at lower (e.g. −30° C.) or higher temperatures (e.g. 110° C.).

Example 2.1 Preparation of Grafted Polyethylene

Preparation of PE-g-MAH: in the reactor completely purged with high purity nitrogen gas, add 40 g of the polyethylene particles prepared in Example 1.1, which has a mean particle size of 85 μm (a standard deviation of 8.21 μm, a viscosity average molecular weight of 1.3×10$^6$, a molecular weight distribution of 9.2), add 2.0 g of benzoyl peroxide, add 2.8 g of maleic anhydride (MAH), add 4 mL of tetrahydrofuran and 5 mL of xylene; then turn on mechanical agitation and rapidly stir for 3 hours; finally, place the reactor in an oil bath at 100° C. and react for 2 hours to obtain a crude grafted product.

Purification of PE-g-MAH: weigh about 4 g of the crude grafted product, which is added to a 500 mL distillation flask with 200 mL of xylene to be heated and dissolved; reflux the mixture for 4 h; after cooling, add acetone (about 200 mL) to the flaskand and shake well; filter the mixture after standing precipitate and then wash once with acetone; dry the filtrate in an oven at 50° C. for 12 h, and cool down to obtain a purified grafted product.

Figure 2:
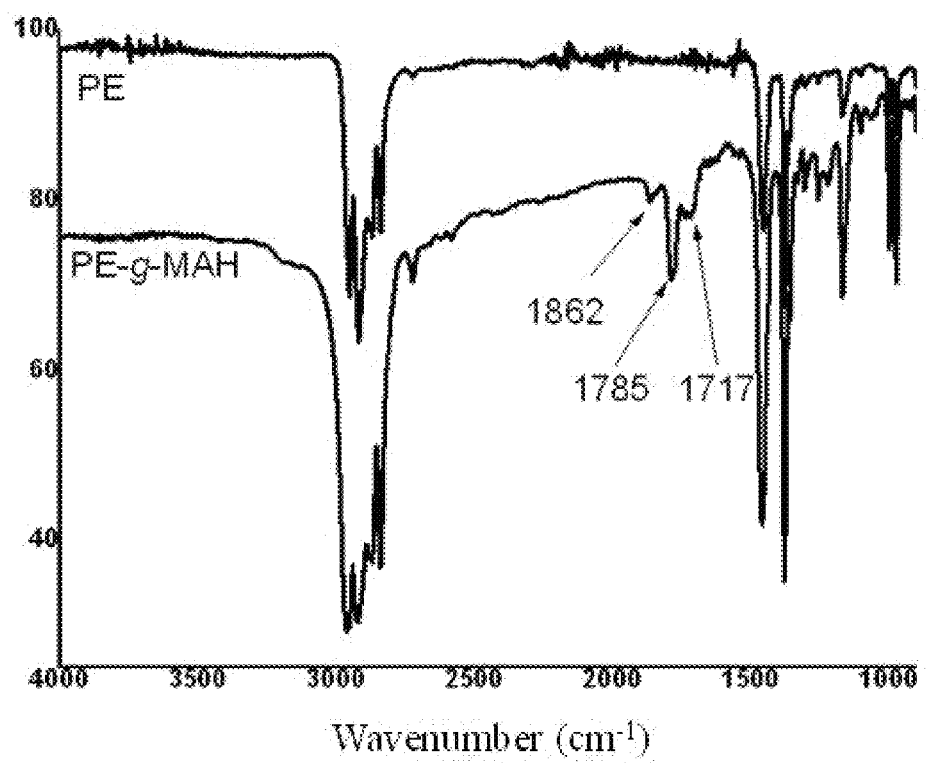
FIG. 2 is an IR spectrum of the maleic anhydride grafted polyethylene of Example 2.1.

IR characterization of PE-g-MAH: the infrared spectra of the purified grafted product were determined according to the above-described method, and the results were shown in FIG. 2, wherein the upper spectrum was the polyethylene raw material (i.e., the base polymer) and the lower was the grafted polyethylene. The characteristic peaks of maleic anhydride are at 1862 cm$^{-1}$, 1785 cm$^{-1}$ and 1717 cm$^{-1}$, indicating that maleic anhydride was successfully grafted onto the polyethylene chains.

Water Contact Angle Measurement: water contact angles were determined according to the above-described method. The water contact angle of the polyethylene raw material (i.e., the base polymer) was 95°, while the water contact angle of the grafted polyethylene was 88°.

Determination of the effective grafting rate of PE-g-MAH: the effective grafting rate of the grafted polyethylene was 1.33% according to the above-described method.

Example 2.2 Preparation of Grafted Polyethylene

Preparation of PE-g-MAH: in the reactor completely purged with high purity nitrogen gas, add 40 g of the polyethylene powder prepared in Example 1.1, which has a mean particle size of 76 μm (a standard deviation of 8.22 μm, a viscosity average molecular weight of 1.7×10$^6$), add 2.0 g of azobisisobutyronitrile, add 2.8 g of maleic anhydride (MAH), add 3 mL of tetrahydrofuran and 6 mL of xylene; then turn on mechanical agitation and rapidly stir for 3 hours; finally, place the reactor in an oil bath at 120° C. and react for 2 hours to obtain a product. The effective grafting rate of the grafted polyethylene with maleic anhydride was determined to be 1.65%, and the water contact angle of the grafted polyethylene was 84°.

Example 2.3 Preparation of Grafted Polyethylene

Preparation of PE-g-AA: in the reactor completely purged with high purity nitrogen gas, add 40 g of the polyethylene powder prepared by the same method as in Example 1.1, which has a mean particle size of 45 μm (a standard deviation of 8.18 μm, a viscosity average molecular weight of $2.7 \times 10^6$), add 2.0 g of benzoyl peroxide, add 2.8 g of acrylic acid and 5 mL of xylene; then turn on mechanical agitation and rapidly stir for 3 hours; finally, place the reactor in an oil bath at 100° C. and react for 2 hours to obtain a product. The effective grafting rate of the grafted polyethylene with acrylic acid was determined to be 2.14%, and the water contact angle of the grafted polyethylene was 80°.

Example 2.4 Preparation of Grafted Polyethylene

Preparation of PE-g-MMA: in the reactor completely purged with high purity nitrogen gas, add 40 g of the polyethylene powder prepared by the same method as in Example 1.1, which has a mean particle size of 70 μm (a standard deviation of 8.21 μm, a viscosity average molecular weight of $1.3 \times 10^6$), add 2.0 g of benzoyl peroxide, add 2.8 g of methyl methacrylate and 5 mL of xylene; then turn on mechanical agitation and rapidly stir for 4 hours; finally, place the reactor in an oil bath at 100° C. and react for 2 hours to obtain a product. The effective grafting rate of the grafted polyethylene with MMA was determined to be 2.04%, and the water contact angle of the grafted polyethylene was 81°.

Preparation Example 3.1 Glass Fiber

In the mixer, glass fibers and a coupling agent were added and stirred for 30 minutes; a diluent was further added and stirred for 30 minutes; and the treated glass fibers of the present invention were obtained. Wherein, the coupling agent was γ-aminopropyltriethoxysilane KH550; the length of the glass fibers was 3-5 mm; and the diluent was white oil. The weight ratio of the diluent to the coupling agent was 3:1; the coupling agent was used in an amount of 2 parts by weight per 100 parts by weight of the glass fibers.

Preparation Example 3.2 Glass Fiber

In the mixer, glass fibers and a coupling agent were added and stirred for 30 minutes; a diluent was further added and stirred for 30 minutes; and the treated glass fibers of the present invention were obtained. Wherein, the coupling agent was vinyltrimethoxysilane A-171; the length of the glass fibers was 3-5 mm; and the diluent was white oil. The weight ratio of the diluent to the coupling agent was 4:1; the coupling agent was used in an amount of 1 part by weight per 100 parts by weight of the glass fibers.

Preparation Example 3.3 Glass Fiber

In the mixer, glass fibers and a coupling agent were added and stirred for 30 minutes; a diluent was further added and stirred for 30 minutes; and the treated glass fibers of the present invention were obtained. Wherein, the coupling agent was vinyltriethoxysilane A-151; the length of the glass fibers was 3-5 mm; and the diluent was liquid paraffin. The weight ratio of the diluent to the coupling agent was 6:1; the coupling agent was used in an amount of 3 parts by weight per 100 parts by weight of the glass fibers.

Examples 3.1-3.9 Glass Fiber-Reinforced Polyethylene Composition

The composition and content of the compositions of Examples 3.1-3.9 of the present invention are listed in Table 2.

TABLE 2

Different ratios of glass fiber-reinforced polyethylene compositions

| Example | Polyethylene | Weight percent | Glass fiber | Weight percent |
|---|---|---|---|---|
| 3.1a | Ethylene homopolymer of Example 1.1 | 60 | Glass fiber of Preparation Example 3.1 | 40 |
| 3.1b | Ethylene homopolymer of Example 1.1 | 50 | Glass fiber of Preparation Example 3.1 | 50 |
| 3.1c | Ethylene homopolymer of Example 1.1 | 40 | Glass fiber of Preparation Example 3.1 | 60 |
| 3.2a | Ethylene homopolymer of Example 1.2 | 60 | Glass fiber of Preparation Example 3.1 | 40 |
| 3.2b | Ethylene homopolymer of Example 1.2 | 50 | Glass fiber of Preparation Example 3.1 | 50 |
| 3.2c | Ethylene homopolymer of Example 1.2 | 40 | Glass fiber of Preparation Example 3.1 | 60 |
| 3.3a | Ethylene homopolymer of Example 1.3 | 60 | Glass fiber of Preparation Example 3.1 | 40 |
| 3.3b | Ethylene homopolymer of Example 1.3 | 50 | Glass fiber of Preparation Example 3.1 | 50 |
| 3.3c | Ethylene homopolymer of Example 1.3 | 40 | Glass fiber of Preparation Example 3.1 | 60 |
| 3.4a | Ethylene homopolymer of Example 1.1 | 60 | Glass fiber of Preparation Example 3.2 | 40 |
| 3.4b | Ethylene homopolymer of Example 1.1 | 50 | Glass fiber of Preparation Example 3.2 | 50 |
| 3.4c | Ethylene homopolymer of Example 1.1 | 40 | Glass fiber of Preparation Example 3.2 | 60 |
| 3.5a | Ethylene homopolymer of Example 1.2 | 60 | Glass fiber of Preparation Example 3.2 | 40 |
| 3.5b | Ethylene homopolymer of Example 1.2 | 50 | Glass fiber of Preparation Example 3.2 | 50 |

TABLE 2-continued

Different ratios of glass fiber-reinforced polyethylene compositions

| Example | Polyethylene | Weight percent | Glass fiber | Weight percent |
|---|---|---|---|---|
| 3.5c | Ethylene homopolymer of Example 1.2 | 40 | Glass fiber of Preparation Example 3.2 | 60 |
| 3.6a | Ethylene homopolymer of Example 1.3 | 60 | Glass fiber of Preparation Example 3.2 | 40 |
| 3.6b | Ethylene homopolymer of Example 1.3 | 50 | Glass fiber of Preparation Example 3.2 | 50 |
| 3.6c | Ethylene homopolymer of Example 1.3 | 40 | Glass fiber of Preparation Example 3.2 | 60 |
| 3.7a | Ethylene homopolymer of Example 1.1 | 60 | Glass fiber of Preparation Example 3.3 | 40 |
| 3.7b | Ethylene homopolymer of Example 1.1 | 50 | Glass fiber of Preparation Example 3.3 | 50 |
| 3.7c | Ethylene homopolymer of Example 1.1 | 40 | Glass fiber of Preparation Example 3.3 | 60 |
| 3.8a | Ethylene homopolymer of Example 1.2 | 60 | Glass fiber of Preparation Example 3.3 | 40 |
| 3.8b | Ethylene homopolymer of Example 1.2 | 50 | Glass fiber of Preparation Example 3.3 | 50 |
| 3.8c | Ethylene homopolymer of Example 1.2 | 40 | Glass fiber of Preparation Example 3.3 | 60 |
| 3.9a | Ethylene homopolymer of Example 1.3 | 60 | Glass fiber of Preparation Example 3.3 | 40 |
| 3.9b | Ethylene homopolymer of Example 1.3 | 50 | Glass fiber of Preparation Example 3.3 | 50 |
| 3.9c | Ethylene homopolymer of Example 1.3 | 40 | Glass fiber of Preparation Example 3.3 | 60 |

Examples 3.10-3.18

Compositions of Examples 3.1-3.9 were used to prepare sheets, respectively.

The composition of Example 3.1a was used as an example. 6 kg of the ethylene homopolymer of Example 1.1 and 4 kg of the glass fiber of Preparation Example 3.1 were homogenously mixed with a high-speed mixer, added into an extruder, extruded through a slit die, cooled and stretched to produce the sheet of the present invention. Wherein, the processing temperature of the extruder was 180° C. to 240° C.

The performance test results of the sheets prepared in Examples 3.10-3.18 are shown in Table 3.

TABLE 3

The performance test results of the sheets prepared in Examples 3.10-3.18

| Example | Creep % | Operating temperature range ° C. | Charpy notched impact strength (7.5 J) KJ/m² | Bending strength (2 mm/min) MPa | Bending modulus (2 mm/min) MPa | Tensile strength (10 mm/min) MPa | Heat distortion temperature (1.8 MPa 3.2 mm) ° C. |
|---|---|---|---|---|---|---|---|
| 3.10a | 1.6 | 30 to −135 | 12.0 | 35.7 | 4753 | 43.2 | 117 |
| 3.10b | 1.5 | 30 to −135 | 11.5 | 36.4 | 4668 | 41.9 | 113 |
| 3.10c | 1.8 | 30 to −135 | 13.0 | 36.1 | 4702 | 40.8 | 110 |
| 3.11a | 1.5 | 30 to −135 | 13.2 | 36.3 | 4683 | 40.3 | 118 |
| 3.11b | 1.6 | 30 to −135 | 14.1 | 37.4 | 4653 | 42.9 | 117 |
| 3.11c | 1.7 | 30 to −135 | 13.6 | 35.9 | 4689 | 45.3 | 115 |
| 3.12a | 1.9 | 30 to −135 | 11.7 | 36.1 | 4721 | 44.4 | 116 |
| 3.12b | 1.6 | 30 to −135 | 12.8 | 35.9 | 4693 | 46.3 | 118 |
| 3.12c | 1.7 | 30 to −135 | 11.9 | 34.6 | 4706 | 42.7 | 113 |
| 3.13a | 1.8 | 30 to −135 | 14.5 | 36.2 | 4696 | 49.3 | 113 |
| 3.13b | 1.9 | 30 to −135 | 15.2 | 36.3 | 4683 | 45.3 | 114 |
| 3.13c | 1.6 | 30 to −135 | 13.6 | 37.4 | 4753 | 40.2 | 113 |

TABLE 3-continued

The performance test results of the sheets prepared in Examples 3.10-3.18

| Example | Creep % | Operating temperature range ° C. | Charpy notched impact strength (7.5 J) KJ/m² | Bending strength (2 mm/min) MPa | Bending modulus (2 mm/min) MPa | Tensile strength (10 mm/min) MPa | Heat distortion temperature (1.8 MPa 3.2 mm) ° C. |
|---|---|---|---|---|---|---|---|
| 3.14a | 1.7 | 30 to −135 | 13.7 | 37.6 | 4781 | 43.8 | 116 |
| 3.14b | 1.9 | 30 to −135 | 14.8 | 35.6 | 4612 | 41.6 | 113 |
| 3.14c | 2.0 | 30 to −135 | 13.9 | 36.9 | 4599 | 42.1 | 114 |
| 3.15a | 2.0 | 30 to −135 | 15.1 | 35.8 | 4601 | 42.9 | 111 |
| 3.15b | 1.8 | 30 to −135 | 14.2 | 35.6 | 4713 | 43.1 | 117 |
| 3.15c | 1.9 | 30 to −135 | 14.9 | 36.2 | 4702 | 44.1 | 114 |
| 3.16a | 1.8 | 30 to −135 | 12.6 | 37.6 | 4681 | 41.3 | 111 |
| 3.16b | 1.6 | 30 to −135 | 13.3 | 36.8 | 4836 | 42.9 | 115 |
| 3.16c | 1.5 | 30 to −135 | 13.2 | 36.3 | 4706 | 47.1 | 117 |
| 3.17a | 1.6 | 30 to −135 | 13.5 | 36.8 | 4638 | 40.9 | 113 |
| 3.17b | 1.7 | 30 to −135 | 12.6 | 37.4 | 4723 | 45.8 | 116 |
| 3.17c | 1.8 | 30 to −135 | 12.9 | 35.9 | 4603 | 43.7 | 117 |
| 3.18a | 2.0 | 30 to −135 | 14.5 | 35.6 | 4821 | 44.1 | 115 |
| 3.18b | 1.8 | 30 to −135 | 15.2 | 36.1 | 4773 | 47.3 | 118 |
| 3.18c | 1.9 | 30 to −135 | 14.9 | 35.9 | 4693 | 45.6 | 112 |

Examples 3.19-3.27

Compositions of Examples 3.1-3.9 were used to prepare pipes, respectively.

The composition of Example 3.1a was used as an example. 6 kg of the ethylene homopolymer of Example 1.1 and 4 kg of the glass fiber of Preparation Example 3.4 were homogenously mixed with a high-speed mixer, added into an extruder, extruded through a pipe die, cooled and stretched to produce the pipe of the present invention. Wherein, the processing temperature of the extruder was 180° C. to 240° C. The wall thickness of the pipe was in the range of 0.5-5 mm.

The performance test results of the pipes produced in Examples 3.19-3.27 were similar to those of the corresponding sheets.

Example 4.1 Solubilized Ethylene Slurry Polymerization

The slurry polymerization process was used. Firstly, the polymerization reactor was pretreated (under the protection of high purity nitrogen, a 5 L high pressure reactor was dried and deoxidized), 500 g of a dispersing medium of cyclohexane was added. 150 mL of n-Hexane, 20 mg of the catalyst prepared as described in the above Preparation Example 1 and 12 ml of triethyl aluminum were sequentially added, and then ethylene gas was fed into the reactor to keep the reactor pressure at 0.7 MPa; wherein, in ethylene, the content of carbon monoxide was less than 5 ppm, the content of carbon dioxide was less than 15 ppm, and the content of conjugated diene was less than 10 ppm; the polymerization reaction started, the system temperature was maintained at 80° C., and the reaction time was 30 minutes. After the polymerization, it was cooled down. The slurry material was directly discharged from the bottom valve, the required amount of white oil was added, and the dispersion medium was removed by distillation to obtain the solubilized ultra-high molecular weight, ultra-fine particle size ethylene homopolymer of the present invention, wherein the weight percent of white oil was 30 wt %. The properties of the obtained polyethylene are shown in Table 4.

Comparative dissolution experiment: 10 g of the ultra-high molecular weight, ultra-fine particle size ethylene homopolymer containing white oil prepared in Example 4.1 was added into 60 g of white oil, and dissolved at 140° C. for 20 minutes.

7 g of the ultra-high molecular weight, ultra-fine particle size ethylene homopolymer prepared in Comparative Example 4.1 was added into 63 g of white oil, and dissolved at 140° C. for 90 minutes.

Example 4.2 Solubilized Ethylene Slurry Polymerization

The slurry polymerization process was used. Firstly, the polymerization reactor was pretreated (under the protection of high purity nitrogen, a 5 L high pressure reactor was dried and deoxidized), and 500 g of a dispersing medium of n-pentane was added. 150 mL of n-Hexane, 20 mg of the catalyst prepared as described in the above Preparation Example 1 and 12 ml of triethyl aluminum were sequentially added, and then ethylene gas was fed into the reactor to keep the reactor pressure at 0.7 MPa; wherein, in ethylene, the content of carbon monoxide was less than 5 ppm, the content of carbon dioxide was less than 15 ppm, and the content of conjugated diene was less than 10 ppm; the polymerization reaction started, the system temperature was maintained at 70° C., and the reaction time was 30 minutes. After the polymerization, it was cooled down. The slurry material was directly discharged from the bottom valve, the required amount of white oil was added, and the dispersion medium was removed by distillation to obtain a solubilized ultra-high molecular weight, ultra-fine particle size ethylene homopolymer, wherein the weight percent of white oil was 40 wt %. The properties of the obtained polyethylene are shown in Table 4.

Solubility was determined by a method similar to that of Example 4.1. The dissolution time was shortened by nearly 80% compared to the polymer with zero solvent content.

Example 4.3 Solubilized Ethylene Slurry Polymerization

The slurry polymerization process was used. Firstly, the polymerization reactor was pretreated (under the protection of high purity nitrogen, a 5 L high pressure reactor was dried and deoxidized), and 500 g of a dispersing medium of cyclohexane and the required amount of white oil were added. 20 mg of the catalyst prepared as described in the above Preparation Example 1 and 12 ml of triethyl aluminum were sequentially added, and then ethylene gas was fed into the reactor to keep the reactor pressure at 0.7 MPa; wherein, in ethylene, the content of carbon monoxide was less than 5 ppm, the content of carbon dioxide was less than 15 ppm, and the content of conjugated diene was less than 10 ppm; the polymerization reaction started, the system temperature was maintained at 50° C., and the reaction time was 30 minutes. After the polymerization, it was cooled down. The slurry material was directly discharged from the bottom valve, and the dispersion medium was removed by distillation to obtain the solubilized ultra-high molecular weight, ultra-fine particle size ethylene homopolymer of the present invention, wherein the weight percent of white oil was 30 wt %. The properties of the obtained polyethylene are shown in Table 4.

Solubility was determined by a method similar to that of Example 4.1. The dissolution time was shortened by nearly 80% compared to the polymer with zero solvent content.

Scanning electron microscopy analysis showed that the polyethylene particles prepared in Examples 4.1-4.3 exhibited good sphericity, spherical or spheroidal, and had a relatively uniform particle size distribution and smaller average particle diameter.

Comparative Example 4.1 Ethylene Homopolymer and Preparation Thereof

Under the protection of high purity nitrogen, a 1 L high pressure reactor was dried and deoxidized. 150 mL of n-Hexane, 20 mg of the catalyst prepared as described in the above Preparation Example 1 and 12 ml of triethyl aluminum were sequentially added, and then ethylene gas was fed into the reactor to keep the reactor pressure at 0.7 MPa; wherein, in ethylene, the content of carbon monoxide was less than 5 ppm, the content of carbon dioxide was less than 15 ppm, and the content of conjugated diene was less than 10 ppm; the polymerization reaction started, the system temperature was maintained at 80° C., and the reaction time was 30 minutes to obtain the ethylene homopolymer.

Comparative Example 4.2 Ethylene Bulk Polymerization

Using a method similar to that of Example 4.1, except for the polymerization temperature and the purity of the monomer, wherein, the purity of ethylene is that the content of carbon monoxide was more than 10 ppm, the content of carbon dioxide was more than 20 ppm, and the content of conjugated diene was more than 20 ppm; the system temperature was maintained at 110° C. The catalyst activity and the properties of the polyethylene are shown in Table 4.

TABLE 4

The catalyst activity of the Ziegler-Natta catalyst prepared in Preparation Example 1 and the properties of the polyethylene obtained in Examples 4.1-4.3

| | | Properties of polyethylene | | | | |
| --- | --- | --- | --- | --- | --- | --- |
| Example | Catalyst activity g PP/(g cat h) | Mean particle size μm | Standard deviation μm | Bulk density g/ml | Viscosity average molecular weight ×10$^6$ g/mol | Molecular weight distribution |
| Example 4.1 | 4000 | 85 | 8.21 | 0.22 | 1.3 | 9.2 |
| Example 4.2 | 3400 | 76 | 8.22 | 0.18 | 1.7 | 6.5 |
| Example 4.3 | 2700 | 45 | 8.18 | 0.16 | 2.7 | 3.1 |
| Comparative Example 4.2 | 4500 | 110 | 8.24 | 0.31 | 0.5 | 12.1 |

Other properties of the polyethylene obtained in Examples 4.1-4.3 were further determined in the present invention. It was found that (1) the wear resistance indexs of the polyethylene in Examples 4.1-4.3 were several times higher than that of common carbon steel or copper, while the wear resistance index of the polyethylene in Comparative Example 4.1 was slightly lower; (2) the impact strengths of the polyethylene in Examples 4.1-4.3 were higher than 10 KJ/m$^2$, while the impact strength in Comparative Example 4.1 was around 3 KJ/m$^2$; (3) chemical corrosion resistances of the polyethylene powder in Examples 4.1-4.3 were better than that of common polyolefin, while the polyethylene powder in Comparative Example 4.1 was easily degradable under acidic conditions; (4) operating temperature range of the polyethylene powder in Examples 4.1-4.3 was wider, which can maintain good toughness and high strength at lower (e.g. −30° C.) or higher temperatures (e.g. 110° C.).

Example 5.1 Preparation of Fiber

The solubilized ultra-high molecular weight, ultra-fine particle size polyethylene of Example 4.1 was mixed with while oil to obtain a mixture, wherein the content of the polymer was 10 wt %; the mixture was dissolved and extruded through a twin-screw extruder, and the temperature of the dissolution extrusion was 200° C. to obtain a spinning solution; the spinning solution was directly extruded with a twin-screw extruder through a spinning assembly and a spinneret, and passed through a cooling water bath (the water bath temperature was 5° C.) to obtain a gel fiber; the gel fiber was via the processes of gel wire drawing, solvent extraction, drying, first hot-box dry-hot drawing, second hot-box dry-hot drawing, heat setting and winding, to obtain the fiber of the present invention.

In the process step of processing the above-described gel fiber into a fiber, the drawing temperature during the gel wire drawing process was 40° C., the draw multiple was 10 times; the extractant during the process of extracting the solvent was selected from cyclohexane; the drying during the drying process was dried by hot air, the hot air temperature was 60° C.; the temperature during the first hot-box dry-hot drawing process was 130° C., the draw multiple was 10 times; the temperature during the second hot-box dry-hot drawing process was 135° C., the draw multiple was 2 times; the temperature during the heat-setting process was 120° C.

Example 5.2 Preparation of Fiber

Other steps were the same as in Example 5.1, except that an antioxidant was further added in the process of mixing with the solvent in step (1), and the added amount of the antioxidant was 0.05 part by weight, per 100 parts by weight of the polyethylene. The antioxidant was composed of a primary antioxidant and a secondary antioxidant, wherein the primary antioxidant was selected from 2,6-di-tert-butyl-4-methylphenol, and the secondary antioxidant was selected from didodecyl thiodipropionate.

The properties of the fibers prepared in Examples 5.1 and 5.2 are listed in Table 5.

TABLE 5

Performance test results of the fibers prepared in Examples 5.1 and 5.2

| Number | Fineness dtex | Breaking strength GPa | Modulus GPa | Elongation at break % | Creep % | Crystallinity % | Melting point ° C. | Operating temperature range ° C. |
|---|---|---|---|---|---|---|---|---|
| Example 5.1 | 2.5 | 2.5 | 120 | 3.0 | 2.0 | 95 | 134 | −30 to 130 |
| Example 5.2 | 2.5 | 3.0 | 220 | 3.5 | 1.5 | 95 | 140 | −30 to 135 |

The data shown in Table 5 indicate that the fiber of the present invention has excellent creep resistance, a wider operating temperature range, and great application prospects.

Example 6.1 Preparation of Film

1) The raw material containing the solubilized ultra-high molecular weight, ultra-fine particle size polyethylene and a solvent for film formation were melt mixed to obtain a solution;

the polymer was the solubilized ultra-high molecular weight, ultra-fine particle size polyethylene prepared in Example 4.1. Meanwhile, an antioxidant was added, and the added amount of the antioxidant was 0.1 part by weight, per 100 parts by weight of the polymer. The antioxidant was composed of a primary antioxidant and a secondary antioxidant, wherein the primary antioxidant was selected from 2,6-di-tert-butyl-4-methylphenol, and the secondary antioxidant was selected from didodecyl thiodipropionate. The solvent for film formation was liquid paraffin. In the solution, the weight percent of the polymer was 30 wt %;

the melt mixing was carried out by a known twin-screw extruder, wherein the temperature of the melt mixing was 180-250° C.

2) The solution was extruded, and a molded body was formed and cooled to produce a polymer sheet. Specifically, the solution of step (1) was extruded from a mold to form a molded body (such as a sheet) during supplying the solution to a mold through an extruder, and a polymer sheet was obtained after cooling by a cooling drum. The surface temperature of the cooling drum was set to 20-40° C., and the cooling rate of the molded body through the cooling drum was more than 20° C./s;

3) The biaxial stretching was used to produce a thin film; the stretching was carried out by a drum method, wherein, the longitudinal stretching multiple was 5 times and the transverse stretching multiple was 5 times.

Examples 6.2-6.6 Preparation of Film

Other steps were the same as in Example 6.1, and the differences were listed in Table 6.

TABLE 6

Specific conditions or parameters of Examples 6.2-6.6

| | Polymer | Stretching mode | Transverse stretching multiple | Longitudinal stretching multiple |
|---|---|---|---|---|
| Example 6.2 | Example 4.1 | Biaxial stretching | 4 | 4 |
| Example 6.3 | Preparation Example 4.1 | Biaxial stretching | 4 | 5 |

TABLE 6-continued

Specific conditions or parameters of Examples 6.2-6.6

| | Polymer | Stretching mode | Transverse stretching multiple | Longitudinal stretching multiple |
|---|---|---|---|---|
| Example 6.4 | Preparation Example 4.1 | Biaxial stretching | 4 | 5 |
| Example 6.5 | Preparation Example 4.1 | Uniaxial stretching | 5 | 4 |
| Example 6.6 | Preparation Example 4.1 | Uniaxial stretching | 5 | 4 |

The properties of the films prepared in Examples 6.1-6.6 are listed in Table 7.

TABLE 7

Performance test results of the films prepared in Examples 6.1-6.6

| | Reference value | Example 6.1 | Example 6.2 | Example 6.3 | Example 6.4 | Example 6.5 | Example 6.6 |
|---|---|---|---|---|---|---|---|
| Film thickness (μm) | 15-60 | 25 | 25 | 25 | 25 | 25 | 25 |
| Tensile strength (Longitudinal) (MPa) | >90 | 150 | 120 | 150 | 150 | 120 | 120 |
| Tensile strength (Transverse) (MPa) | >35 | 150 | 120 | 120 | 120 | 150 | 150 |
| Elongation at break (%) | >40 | 61 | 60 | 63 | 62 | 61 | 62 |
| Puncture strength (N) | >3 | 5.5 | 6.5 | 6.8 | 5.9 | 5.9 | 5.9 |
| Melting temperature (° C.) | >160 | 170 | 172 | 168 | 165 | 171 | 165 |
| Porosity (%) | 30-60 | 33 | 36 | 39 | 37 | 39 | 43 |
| Pore size distribution (nm) | 40-100 | 54 | 51 | 53 | 49 | 52 | 49 |
| Permeability (25 μm), s/40 ml. 1in2. 31 mm H$_2$O | <30 | 19 | 18 | 17 | 19 | 18 | 17 |
| Heat shrinkage ratio (120° C., 1 h) (%) | <2 | 1.0 | 1.2 | 1.3 | 1.2 | 1.1 | 1.0 |

The embodiments of the present invention are described above. However, the present invention is not limited to the above embodiments. Any modification, equivalent alternative, improvement, etc., falling within the spirit and scope of the present invention, are intended to be included within the scope of the present invention.

The invention claimed is:

1. A method for preparing an ultra-high molecular weight, ultra-fine particle size polyethylene powder, comprising:
carrying out ethylene polymerization in presence of a catalyst at a polymerization temperature of −20° C. to 100° C., wherein, in the ethylene, a content of carbon monoxide is not higher than 5 ppm, a content of carbon dioxide is not higher than 15 ppm, and a content of conjugated diene is not higher than 10 ppm,
wherein the catalyst is prepared by a method comprising steps of:
(a) mixing magnesium halide, an alcohol compound, a titanate compound, a first portion of an internal electron donor compound, and a solvent to prepare a mixture I;
(b) adding the mixture I into a reactor, preheating to −30° C.-30° C., and adding a first portion of a titanium compound to form a reaction mixture; or adding the first portion of the titanium compound into the reactor, preheating to −30° C.-30° C., and adding the mixture I to form the reaction mixture;
(c) raising the temperature of the reaction mixture and maintaining the temperature at 90° C.-130° C. for 0.5-3 hours, adding a second portion of the internal electron donor compound to the reaction mixture, and continuously reacting;
(d) filtering the reaction mixture to remove liquid, adding a second portion of the titanium compound, and continuously reacting; and
(e) obtaining the catalyst after post-treatment.

2. The method according to claim 1, wherein the polyethylene powder has a viscosity average molecular weight (Mv) of greater than 1×10$^6$, a mean particle size of 10-100 μm, a standard deviation of 2 μm-15 μm, and a bulk density of 0.1 g/mL-0.3 g/mL, and a particle size distribution that is substantially a normal distribution.

3. A method for preparing an ultra-high molecular weight, ultra-fine particle size grafted polyethylene, comprising:
preparing a polyethylene powder according to the method of claim 1;
mixing the polyethylene powder, a grafting monomer, an initiator and an interface agent to form a mixture;
heating the mixture to carry out a solid-phase grafting reaction to form the grafted polyethylene.

4. The method according to claim 3, wherein the solid-phase grafting reaction is carried out at a temperature of 60-120° C. for 0.5-5 hours, wherein
the grafting monomer is a siloxane-based compound or a vinyl-based unsaturated compound, and said initiator is an azo initiator or a peroxide initiator.

5. The method according to claim 3, wherein an effective grafting rate of the grafting monomer is ≥0.5%, the polyethylene powder is spherical or substantially spherical particles having a mean particle size of 10 μm-100 μm, a standard deviation of 2 μm-15 μm and, a bulk density of 0.1 g/mL-0.3 g/mL, and a viscosity average molecular weight (Mv) of greater than 1×10$^6$.

6. The method according to claim 5, wherein,
the effective grafting rate is 1.0-3.0%, the mean particle size of said polyethylene powder is 20 μm-80 μm, the standard deviation of said polyethylene powder is 5 μm-15 μm,
a water contact angle of said grafted polyethylene is 80°-88°,
the bulk density of said polyethylene is 0.15 g/mL-0.25 g/mL,
the viscosity average molecular weight (Mv) of said polyethylene is greater than or equal to 1.5×10$^6$, and
said polyethylene is an ethylene homopolymer having a molecular weight distribution (Mw/Mn) of 2-15.

7. A method for preparing a glass-fiber enforced polyethylene sheet, comprising:
preparing a polyethylene powder according to the method of claim 1;
mixing the polyethylene powder with and glass fibers; and
extruding the mixture through a sheet die.

8. A method for preparing a glass-fiber enforced polyethylene pipe, comprising:
preparing a polyethylene powder according to the method of claim 1;
mixing the polyethylene powder and glass fibers; and
extruding the mixture through a pipe mold.

9. The method according to claim 2, wherein the polymerization temperature is 30° C.-80° C.

10. The method according to claim 2, wherein the polymerization temperature is 50° C.-80° C.

11. An ultra-high molecular weight, ultra-fine particle size polyethylene powder prepared by the method according to claim 1, having a viscosity average molecular weight (Mv) of greater than $1 \times 10^6$, a standard deviation of 2 μm-15 μm, and a bulk density of 0.1 g/mL-0.3 g/mL, having a particle size distribution that is substantially a normal distribution, and a mean particle size of 20 μm-80 μm.

12. The ultra-high molecular weight, ultra-fine particle size polyethylene powder according to claim 11, wherein the mean particle size of said polyethylene powder is 50 μm-80 μm.

13. The method according to claim 4, wherein an amount of said grafting monomer is 0.2-15 wt % by weight of the polyethylene powder and an amount of said initiator is 0.1-10 wt % by weight of the polyethylene powder,
wherein the vinyl-based unsaturated compound is selected from a styrene-based compound, a vinyl-based unsaturated organic acid, a vinyl-based unsaturated organic ester, a vinyl-based unsaturated organic acid anhydride, acrylic acid (AA), methacrylic acid (MAA), methyl acrylate (MA), methyl methacrylate (MMA), ethyl acrylate (EA), ethyl methacrylate (MEA), butyl acrylate (BA), butyl methacrylate (BMA), maleic anhydride (MAH), maleic acid, styrene (St), and pentaerythritol triacrylate (PETA), and mixtures thereof,
the siloxane-based compound is selected from vinyltrimethylsilane, vinyltriethylsilane, divinyldimethylsilane, (triethylsilyl)acetylene, allyltrimethylsilane, and mixtures thereof, and said initiator is an azo initiator or a peroxide initiator.

14. An ultra-high molecular weight, ultra-fine particle size grafted polyethylene, comprising the polyethylene powder prepared according to the method of claim 1, and a grafting monomer grafted on the polyethylene powder, wherein the grafting monomer is a siloxane-based compound or a vinyl-based unsaturated compound, and an amount of said grafting monomer is 0.2-15 wt % by weight of the polyethylene powder.

15. An ultra-high molecular weight, ultra-fine particle size grafted polyethylene of claim 14, wherein the vinyl-based unsaturated compound is selected from a styrene-based compound, a vinyl-based unsaturated organic acid, a vinyl-based unsaturated organic ester, a vinyl-based unsaturated organic acid anhydride, acrylic acid (AA), methacrylic acid (MAA), methyl acrylate (MA), methyl methacrylate (MMA), ethyl acrylate (EA), ethyl methacrylate (MEA), butyl acrylate (BA), butyl methacrylate (BMA), maleic anhydride (MAH), maleic acid, styrene (St), and pentaerythritol triacrylate (PETA), and mixtures thereof, the siloxane-based compound is selected from vinyltrimethylsilane, vinyltriethylsilane, divinyldimethylsilane, (triethylsilyl)acetylene, allyltrimethylsilane, and mixtures thereof, and said initiator is an azo initiator or a peroxide initiator.

\* \* \* \* \*